(12) United States Patent
Tago et al.

(10) Patent No.: US 11,381,124 B2
(45) Date of Patent: Jul. 5, 2022

(54) ROTOR CORE, ROTOR OF ROTARY ELECTRICAL MACHINE, ROTARY ELECTRICAL MACHINE, AND AUTOMOTIVE AUXILIARY ELECTRICAL SYSTEM

(71) Applicant: Hitachi Automotive Systems, Ltd., Hitachinaka (JP)

(72) Inventors: Kazutami Tago, Tokyo (JP); Hiroshi Kanazawa, Hitachinaka (JP); Kenji Nakayama, Hitachinaka (JP); Yuji Tsuji, Tokyo (JP); Takayuki Chikaoka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 229 days.

(21) Appl. No.: 16/648,843

(22) PCT Filed: Jul. 30, 2018

(86) PCT No.: PCT/JP2018/028381
§ 371 (c)(1),
(2) Date: Mar. 19, 2020

(87) PCT Pub. No.: WO2019/064885
PCT Pub. Date: Apr. 4, 2019

(65) Prior Publication Data
US 2020/0266677 A1 Aug. 20, 2020

(30) Foreign Application Priority Data

Sep. 29, 2017 (JP) .............................. JP2017-191936

(51) Int. Cl.
*H02K 1/27* (2022.01)
*H02K 1/16* (2006.01)
(Continued)

(52) U.S. Cl.
CPC ............ *H02K 1/276* (2013.01); *B62D 5/0409* (2013.01); *H02K 1/165* (2013.01); *H02K 7/1023* (2013.01); *H02K 29/03* (2013.01); *H02K 2213/03* (2013.01)

(58) Field of Classification Search
CPC ...... H02K 1/276; H02K 1/165; H02K 7/1023; H02K 29/03; H02K 2213/03;
(Continued)

(56) References Cited

U.S. PATENT DOCUMENTS

| 9,906,083 B2 * | 2/2018 | Cao ........................... H02K 1/02 |
| 2014/0042854 A1 * | 2/2014 | Asahi .................... H02K 1/2773 310/156.08 |

(Continued)

FOREIGN PATENT DOCUMENTS

| CN | 104917349 A | 9/2015 |
| JP | 2002-136011 A | 5/2002 |

(Continued)

OTHER PUBLICATIONS

International Search Report (PCT/ISA/210) issued in PCT Application No. PCT/JP2018/028381 dated Nov. 6, 2018 with English translation (five pages).

(Continued)

*Primary Examiner* — Thomas Truong
(74) *Attorney, Agent, or Firm* — Crowell & Moring LLP

(57) ABSTRACT

A torque ripple in a rotary electric machine is sufficiently reduced. At least two of the plurality of laminated plates in the rotor core include a magnetic pole having the base formed on the outer peripheral side of the storage space, and a bridge part connected to the magnetic pole. A plurality of magnetic poles are provided in the circumferential direction, and the first space is formed between the bases of a pair of magnetic poles adjacent in the circumferential direction. The (Continued)

q-axis outer peripheral portion, which is located between the pair of circumferentially adjacent magnetic poles and is in contact with the first space, is provided on the inner peripheral side of the base. The base includes the side surface portion which is in contact with the first space, and the protrusion which is provided on the outer peripheral side of the side surface portion and protrudes in the circumferential direction with respect to the side surface portion. The bridge are arranged on the inner peripheral side of the side surface portion.

10 Claims, 33 Drawing Sheets

(51) Int. Cl.
*H02K 1/276* (2022.01)
*B62D 5/04* (2006.01)
*H02K 7/102* (2006.01)
*H02K 29/03* (2006.01)

(58) Field of Classification Search
CPC ............ H02K 2201/03; H02K 1/2766; B62D 5/0409; B62D 5/0403
See application file for complete search history.

(56) References Cited

U.S. PATENT DOCUMENTS

| 2014/0191628 | A1* | 7/2014 | Nakano | H02K 11/225 |
| | | | | 310/68 B |
| 2015/0001978 | A1* | 1/2015 | Haga | H02K 1/28 |
| | | | | 310/156.12 |

FOREIGN PATENT DOCUMENTS

| JP | 2007-295708 A | 11/2007 |
| JP | 2016-178863 A | 10/2016 |
| WO | WO 2014/027631 A1 | 2/2014 |

OTHER PUBLICATIONS

Japanese-language Written Opinion (PCT/ISA/237) issued in PCT Application No. PCT/JP2018/028381 dated Nov. 6, 2018 (four pages).

* cited by examiner

ROTOR CORE, ROTOR OF ROTARY ELECTRICAL MACHINE, ROTARY ELECTRICAL MACHINE, AND AUTOMOTIVE AUXILIARY ELECTRICAL SYSTEM

TECHNICAL FIELD

The present invention relates to a rotor core, and a rotor using the rotor core, a rotary electric machine, and an automotive auxiliary electrical system.

BACKGROUND ART

In recent years, with the shift from hydraulic systems to electric systems and the expansion of the hybrid and electric vehicle markets, the mounting rate of electric power steering (hereinafter, referred to as EPS) and electric brake devices has increased rapidly. In addition, with the spread of vehicles which partially automate driving operations such as idling stop and braking, driving comfort has been improved, and noise in the vehicle interior has been reduced.

As vibration sources originating from the electric motor, which lead to vibration and noise in the vehicle interior, there are torque fluctuation components (cogging torque and torque ripple) of the electric motor and an electromagnetic excitation force generated between the stator and the rotor of the electric motor. Among them, the vibration energy due to the torque fluctuation component propagates into the vehicle interior via the output shaft of the electric motor, and the vibration energy due to the electromagnetic excitation force propagates into the vehicle interior via the mechanical parts of the EPS device. The propagation of these vibration energies into the vehicle interior leads to vibration and noise in the vehicle interior.

For example, in the EPS device, the electric motor assists the steering wheel operation, so the driver feels the cogging torque and the torque ripple of the electric motor through the steering wheel. In order to suppress this problem, it is generally required that the electric motor used in the EPS device suppress the cogging torque to less than $\frac{1}{1000}$ of the assist torque and the torque ripple to less than $\frac{1}{100}$ of the assist torque. In addition, it is preferable that the minimum order of the spatial mode of the electromagnetic excitation force is not less than 2.

Here, the price of the electric motor is made up of the cost of materials such as magnets and windings and the cost of manufacturing. However, since the ratio of the price of magnets is particularly high, there is a strong demand for reduction in magnet cost. In addition, there is also a demand for simplification of manufacturing, reduction in required manpower and manufacturing equipment. For this reason, an electric motor used for an automotive auxiliary electrical system also needs to satisfy these demands.

As the electric motor used in the EPS device, a permanent magnet brushless motor (hereinafter, referred to as a "permanent magnet rotary electric machine") is generally used in terms of miniaturization and reliability.

Permanent magnet rotary electric machines are roughly classified into surface magnet type (SPM), which is excellent in power density, and interior permanent magnet type (IPM), which is excellent in magnet cost. In each case, magnets separated into a number corresponding to the number of poles are often used from the viewpoint of magnet cost reduction.

For example, in the interior permanent magnet type, an integral rotor core having a magnet storage space is usually used. Since the integral rotor core has high manufacturing accuracy of the rotor magnetic pole, an air gap length between the rotor magnetic pole and the stator can be reduced. Although the magnetic flux leaks from the bridge of the magnet storage space, the torque is lower than that of the surface magnet type. However, the reduction in the torque can be suppressed by shortening the air gap length. In addition, since a rectangular magnet can be used, the magnet cost can be reduced. Further, there is also an advantage that a magnet cover required for the surface magnet type is not required.

However, when rectangular magnets having uniform magnetization are arranged in the circumferential direction, if the outer periphery of the integral rotor core is formed in an annular shape, the magnetic flux distribution will not be sinusoidal shape, and the torque ripple and cogging torque cannot be sufficiently reduced. For this reason, it is necessary to reduce the torque ripple and the cogging torque by devising the magnetic pole shape, such as projecting the end of the magnetic pole on the outer peripheral side. Even when the surface magnet type is employed, the same problem occurs. Therefore, it is necessary to reduce the torque ripple and the cogging torque by devising the width and the outer curvature of the magnet. Here, if the winding method, the number of poles, the number of slots, the magnet method, etc. are different, the magnetic flux distribution will be different, so the width and outer curvature of the magnet will have different magnetic pole shapes, but the protrusion of the magnetic pole is common.

In addition, since the EPS device rotates in both forward and reverse directions, it is necessary to make the magnetic flux distribution around the magnetic pole symmetrical in both rotational directions, and a symmetrical magnetic pole is used.

A related art of a brushless motor having a symmetrical magnetic pole shape is disclosed in PTL 1. The brushless motor 1 described in PTL 1 is of an IPM type in which a magnet 16 is accommodated and fixed in a rotor 3. The rotor core 15 forming the rotor 3 includes a core body 31 fixed to a rotor shaft 13 and six magnetic poles 32 projecting from the core body 31 in the radial direction. The magnetic pole 32 is provided with a magnet-mounting hole 33 for accommodating and fixing the magnet 16, and a groove-shaped concave portion 35 is formed between the adjacent magnetic poles 32. Notches 39 are provided at both ends in the circumferential direction of the magnetic pole 32 so as to face the concave portion 35. The concave portion 35 is configured by a side wall 36 of the adjacent magnetic pole 32 and a bottom portion 37 which is an outer peripheral surface of the core body 31. The width X of the side wall 36 is approximately the same as the thickness t of the core plate, but not more than 1.2 times.

CITATION LIST

Patent Literature

PTL 1: WO 2014/027631

SUMMARY OF INVENTION

Technical Problem

The brushless motor disclosed in PTL 1 has much room for improvement with respect to reduction of torque ripple.

Solution to Problem

A rotor core according to the invention is configured by a plurality of laminated plates and forms a storage space for the magnet. At least two of the plurality of laminated plates include a magnetic pole which has a base formed on an outer peripheral side of the storage space, and a bridge which is connected to the magnetic pole. A plurality of the magnetic poles are provided in a circumferential direction. A first space is formed between the bases of a pair of the magnetic poles adjacent in the circumferential direction. A q-axis outer peripheral portion which is located in the middle of a pair of the magnetic poles adjacent to each other in the circumferential direction and is in contact with the first space is provided on an inner peripheral side from the base. The base includes a side surface portion in contact with the first space, and a protrusion which is provided on an outer peripheral side of the side surface portion and protrudes in the circumferential direction with respect to the side surface portion. The bridge is disposed on an inner peripheral side from the side surface portion.

A rotor according to the invention includes the rotor core described above, a rotation shaft fixed to the rotor core, and a permanent magnet disposed in the storage space.

A rotary electric machine according to the invention includes the above-described rotor and a stator having a plurality of windings and arranged to face the rotor via a predetermined air gap.

An automotive auxiliary electrical system according to the invention includes the rotary electric machine described above, and performs electric power steering or electric braking using the rotary electric machine.

Advantageous Effects of Invention

According to the invention, torque ripple can be sufficiently reduced.

DESCRIPTION OF EMBODIMENTS

Figure 1:
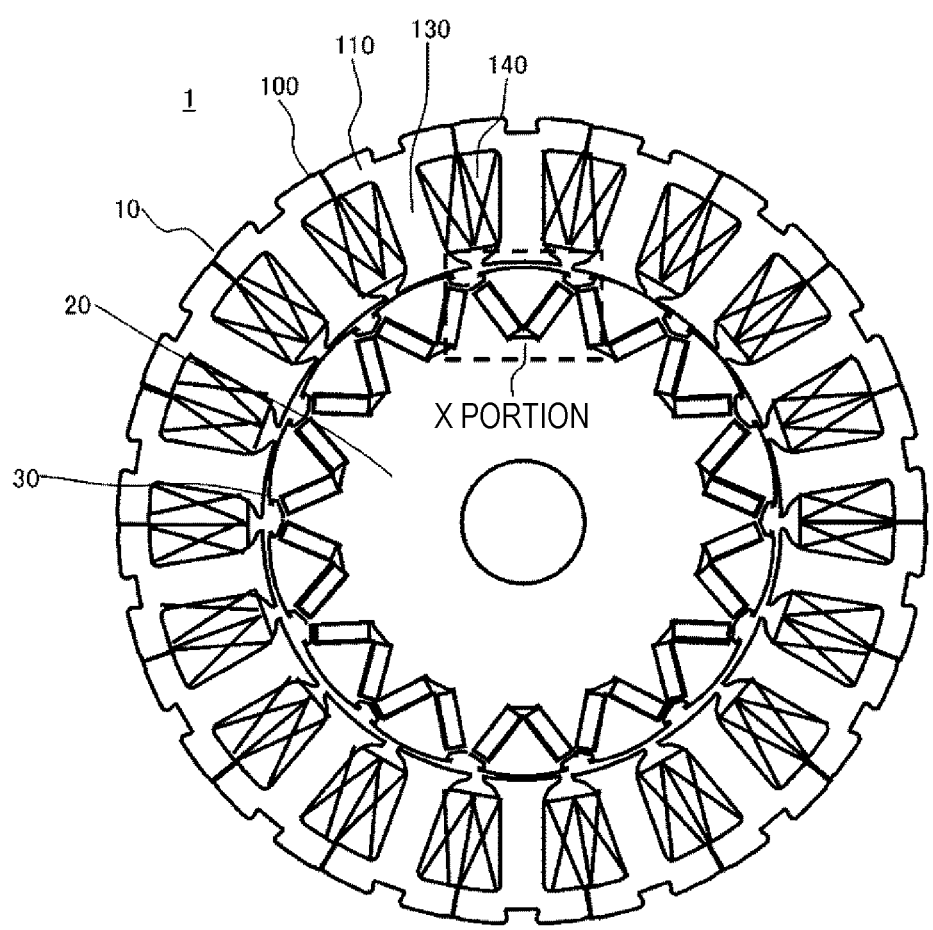
FIG. 1 is a cross-sectional view in a rotation plane of a permanent magnet rotary electric machine according to a first embodiment of the invention.

Embodiments of the invention will be described in detail with reference to the drawings as appropriate. Further, the same components in the drawings are denoted by the same reference numerals, and description thereof will be omitted.

First Embodiment

Figure 2:
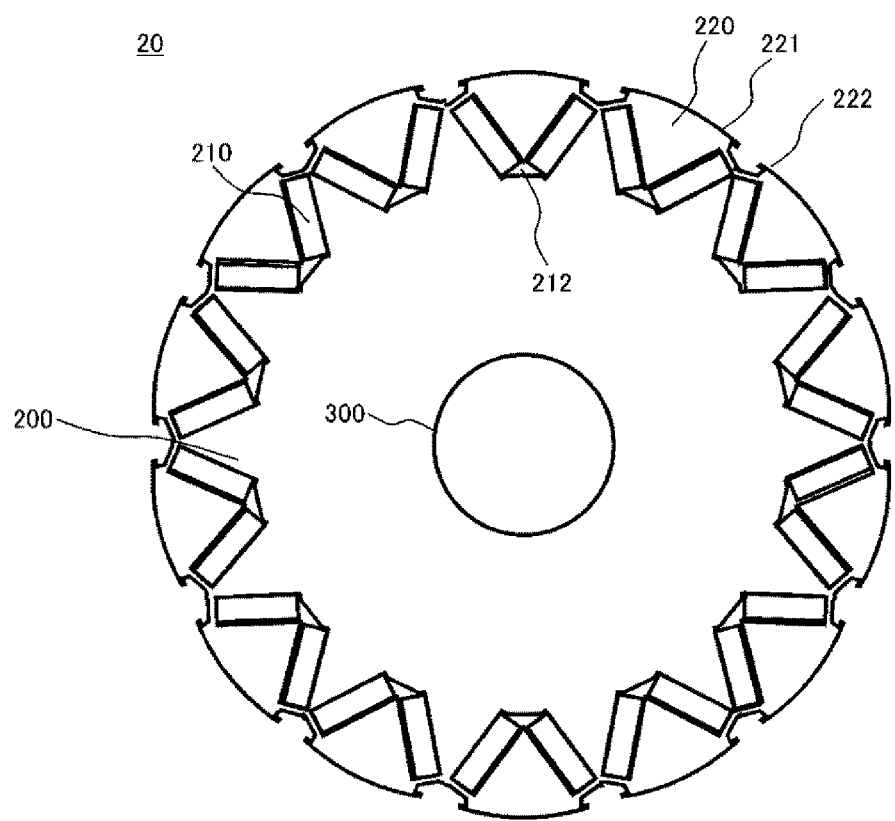
FIG. 2 is a cross-sectional view of a rotor according to the first embodiment of the invention.
Figure 3:
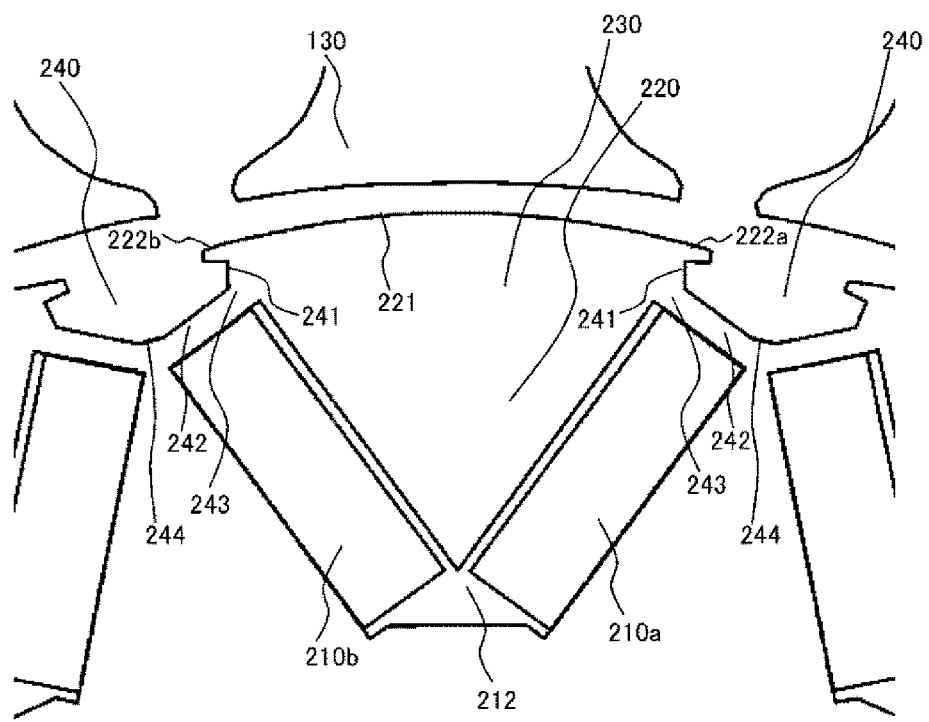
FIG. 3 is an enlarged view of the vicinity of a magnetic pole of a cross section of the rotor according to the first embodiment of the invention.

A configuration of a permanent magnet rotary electric machine 1 including a rotor core according to a first embodiment of the invention will be described with reference to FIGS. 1 to 3. FIG. 1 is a cross-sectional view in the rotation plane of the permanent magnet rotary electric machine 1 according to the first embodiment. FIG. 2 is a cross-sectional view of a rotor 20 according to the first embodiment. FIG. 3 is an enlarged view of the vicinity of a magnetic pole of a cross section of the rotor 20 according to the first embodiment, and is an enlarged view of an X portion surrounded by a dotted line in FIG. 1.

As illustrated in FIG. 1, the permanent magnet rotary electric machine 1 of this embodiment is a concentrated winding permanent magnet rotary electric machine having 14 poles and 18 slots in which a substantially annular stator 10 is disposed on an outer peripheral side, and the substantially cylindrical rotor 20 is disposed on an inner peripheral side. An air gap 30 is provided between the stator 10 and the rotor 20. The stator 10 includes a stator core 100, a core back 110, and a plurality of windings 140, and is arranged to face the rotor 20 via the air gap 30.

The stator 10 is formed, for example, as follows. First, T-shaped teeth 130 are formed by a laminated body in which split punched cores of electromagnetic steel sheets are laminated. Next, after winding an electric wire around the teeth 130 to form the winding 140, the plurality of teeth 130 and the winding 140 are assembled into an annular shape, and are integrated by shrink fitting or press fitting into a housing (not illustrated). Thus, the stator 10 is formed.

In addition, as illustrated in FIG. 2, the rotor 20 of this embodiment includes a rotor core 200 that is an iron core in which electromagnetic steel sheets are laminated, and a shaft 300 that is a rotation axis. The outer periphery of the rotor core 200 is provided with 14 magnetic poles 220 in the circumferential direction. Each of the magnetic poles 220 forms a surface facing the stator 10 and is provided with protrusions 222 at both ends of a magnetic pole arc 221 serving as a magnetic pole outer peripheral surface, and includes a V-shaped storage space 212 in which the permanent magnet 210 is stored. In the storage space 212, two rectangular permanent magnets 210 are inserted and arranged for each magnetic pole 220.

As illustrated in FIG. 3, a first space 240 that is concave with respect to the magnetic pole arc 221 is formed between a pair of magnetic poles 220 which are adjacent in the circumferential direction. A bridge 242 is formed between the first space 240 and the storage space 212. Further, in FIG. 3, one of the two permanent magnets 210 housed in the storage space 212 is illustrated as a first permanent magnet 210a, and the other is illustrated as a second permanent magnet 210b. The bridge 242 is connected to the magnetic pole 220 and also connected to a core outermost peripheral portion 244 in the q-axis direction located at the bottom of the first space 240 (hereinafter, referred to as a q-axis outer peripheral portion 244). In other words, the bridge 242 is formed so as to connect the magnetic pole 220 and the q-axis outer peripheral portion 244.

The magnetic pole 220 includes a base 230 which protrudes in a radial direction from the storage space 212 toward the outer diameter side. The base 230 includes the protrusions 222 at both ends of the magnetic pole arc 221 as described above. Further, in FIG. 3, one protrusion 222 is illustrated as a first protrusion 222a, and the other protrusion 222 is illustrated as a second protrusion 222b. Further, the base 230 includes a pair of connecting portions 243 which are connecting portions with the bridge 242, and a pair of side surface portions 241 which are in contact with the first space 240. The side surface portion 241 is disposed on the inner peripheral side in a radial direction from the protrusion 222 (the first protrusion 222a and the second protrusion 222b). In other words, the protrusion 222 is provided on the outer peripheral side of the side surface portion 241 and protrudes in the circumferential direction with respect to the side surface portion 241. On the other hand, the bridge 242 and the q-axis outer peripheral portion 244 are arranged on the inner peripheral side in the radial direction of the side surface portion 241. The first space 240 faces the protrusion 222, the bridge 242, and the q-axis outer peripheral portion 244.

The q-axis outer peripheral portion 244 is located in the middle of the pair of magnetic poles 220 adjacent in the circumferential direction, and is provided on the inner peripheral side in the radial direction from the base 230. The q-axis outer peripheral portion 244 is arranged between two bridges 242 connected to the pair of magnetic poles 220 adjacent in the circumferential direction.

In general, a torque ripple generated in a rotary electric machine is a pulsation of a rotating force due to a magnet magnetic field and a winding magnetic field, and thus does not occur if both magnetic fields in an air gap are sinusoidal shape. In an interior permanent magnet rotary electric machine with a short air gap length, the stator has the same configuration as the surface magnet type. Therefore, the magnetic field from the stator generated when a sinusoidal current is imposed on the windings becomes sinusoidal shape in the air gap. On the other hand, regarding the rotor, the magnetic flux easily passes through the rotor core as the portion is closer to the stator. Therefore, the magnetic field from the rotor may deviate from a sinusoidal shape depending on the shape of the magnetic poles in the outer peripheral portion of the rotor core. In such a case, it is considered that the torque ripple may increase.

For example, in a case where the magnetic pole shape is a semi-cylindrical shape, the permeance changes rapidly at the magnetic pole tip, and the change in the difficulty and ease of passage of the magnetic field at the magnetic pole extreme occurs. Therefore, it is considered that the change in the magnetic field in the air gap near the magnetic pole tip increases, the magnetic field from the rotor deviates from a sinusoidal shape, and the torque ripple increases. This is particularly noticeable in a case where the air gap length is short. In addition, even in a case where the bridge at the magnetic pole tip is near the stator, the magnetic field passes through the bridge and enters the air gap, so that the magnetic field from the rotor deviates from a sinusoidal shape and the torque ripple is considered to increase. In addition, even in a case where the core outermost peripheral portion in the q-axis direction is near the stator, a magnetic field passes therethrough, so that the magnetic field from the rotor deviates from a sinusoidal shape, and it is considered that the torque ripple increases.

In order to make the magnetic field from the rotor near a sinusoidal shape, it is important to adopt an appropriate magnetic pole shape. However, the radius of the magnetic pole arc and the magnetic pole width are difficult to change because they are determined according to a reduction demand for cogging torque. In addition, when the air gap length is shortened in response to a demand for higher torque, the influence of the rotor shape on the magnetic field increases, and the torque ripple tends to increase. In addition, in an interior permanent magnet (VIPM) rotary electric machine in which magnets are embedded in a V-shape, the amount of magnetic flux passing through one magnetic pole becomes large in a rotary electric machine with a structure which can take a large area of the surface having the polarity of the magnet. Therefore, it is considered that the influence on the magnetic field by the magnetic pole shape as described above (that is, the influence on the magnetic field due to the magnetic pole tip of a semi-cylindrical shape, the bridge of the magnetic pole tip, and the core outermost peripheral portion in the q-axis direction near the stator) becomes large. Therefore, it is considered important to devise a shape in the space near the magnetic pole tip and between the magnetic poles in order to make the magnetic field from the rotor closer to a sinusoidal shape.

From the above study, it has been confirmed that the following configuration is effective for reducing the torque ripple in the permanent magnet rotary electric machine.

(1) In order to suppress a sudden change in the permeance of the magnetic pole tip, a protrusion is formed at the pole tip. This makes it possible to moderate the change in the magnetic field in the air gap near the magnetic pole tip by utilizing a large magnetic resistance of the protrusion.

(2) The bridge is separated inward in a radial direction from the stator. Thus, it is possible to prevent the magnetic field from going to the air gap through the bridge.

(3) The core outermost peripheral portion in the q-axis direction is separated inward in a radial direction from the stator. Thereby, it is possible to prevent the magnetic field from passing through the core outermost peripheral portion in the q-axis direction to the air gap.

(4) A side surface portion is provided between the protrusion and the bridge, and the bridge and the core outermost peripheral portion in the q-axis direction are set inward in a radial direction from the side surface portion to separate these components. Thus, it is possible to prevent the magnetic field passing through the protrusion from being supplied via the bridge and the core outermost peripheral portion in the q-axis direction.

Further, if the configuration of the above (4) is not adopted, a magnetic field via the protrusion is likely to be supplied to the air gap from the bridge or the core outermost peripheral portion in the q-axis direction. Then, the magnetic field passing through the protrusion fluctuates together with the magnetic field passing through the bridge or the core outermost peripheral portion in the q-axis direction, and thus the magnetic field from the bridge or the core outermost peripheral portion in the q-axis direction is supplied to the air gap. Therefore, it becomes an obstacle to torque ripple reduction. Therefore, the configuration of the above (4) is also necessary for reducing the torque ripple.

With the above configuration, the magnetic field passing from the magnetic pole tip to the air gap can be substantially only the magnetic field passing from the base to the protrusion. As a result, the magnetic resistance from the rotor in the air gap near the magnetic pole tip becomes gentle because the magnetic resistance of the protrusion is large, and it is considered that the magnetic field can be approximated to a sinusoidal shape.

The configuration of the permanent magnet rotary electric machine 1 of this embodiment described with reference to FIGS. 1 to 3 is determined based on the results of the above study. In other words, due to the presence of the side surface portion 241, the bridge 242 and the q-axis outer peripheral portion 244 are arranged so as not to approach the protrusions 222 (the first protrusions 222a and the second protrusions 222b). This makes it difficult for the magnetic field generated by the permanent magnet 210 (the first permanent magnet 210a and the second permanent magnet 210b) to be supplied to the protrusion 222 via the bridge 242 or the q-axis outer peripheral portion 244. As a result, the magnetic field passing from the magnetic pole 220 to the air gap 30 is substantially only the magnetic field passing from the base 230 to the protrusion 222. Therefore, since the magnetic resistance of the protrusion 222 is large, the magnetic field from the rotor 20 in the air gap 30 near the magnetic pole 220 becomes gentle, and it becomes possible to approximate a sinusoidal shape. This is suitable for an IPM rotary electric machine which can shorten the air gap length. In particular, it is suitable for a rotary electric machine having a VIPM structure which can increase the amount of magnetic flux passing through one magnetic pole, such as the permanent magnet rotary electric machine 1 of this embodiment.

Further, the tip of the protrusion 222 needs to have a certain thickness or more due to restrictions in mass production. In this embodiment, for example, it is preferable that the protrusion 222 be formed so that the thickness on the root side is 40% or more of the thickness of the electromagnetic steel sheet.

With the use of the magnetic pole 220 and the first space 240 having the shapes described above, it is possible to obtain the rotor core 200 which is a rotor core excellent in reducing torque ripple, the rotor 20 using the rotor core 200, and the permanent magnet rotary electric machine 1.

Figure 4:
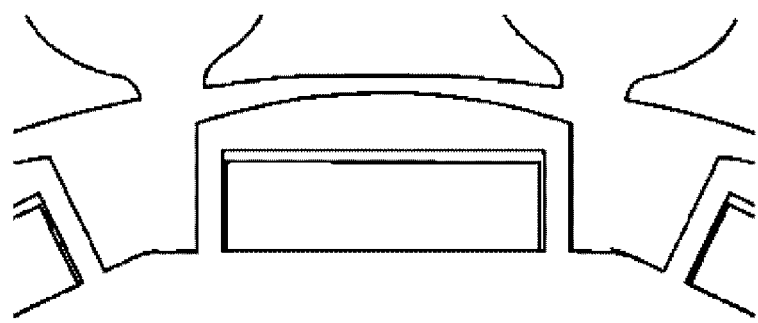
FIG. 4 is an enlarged view of the vicinity of a magnetic pole of a cross section of a rotor according to a first comparative example.

As a result of calculating the characteristics of the permanent magnet rotary electric machine 1 of this embodiment by magnetic field analysis, the torque ripple is calculated to be 0.76% in a case where the air gap length is 0.5 mm. On the other hand, as a result of calculating the characteristics of the first comparative example, assuming that a rotary electric machine having a general IPM structure having a semi-cylindrical magnetic pole shape as illustrated in FIG. 4 as a first comparative example, the torque ripple is calculated to be 1.93%. Further, FIG. 4 is an enlarged view of the vicinity of the magnetic pole in the cross section of the rotor according to the first comparative example. In addition, the calculation result of the torque ripple is obtained by calculating the magnetic flux distribution of the stator 10, the rotor 20, and the air gap 30 and the electromagnetic stress of the air gap 30 by a magnetic field analysis using a finite element method, and calculating the torque corresponding to the rotation angle.

According to the configuration of this embodiment, it can be seen that the torque ripple can be sufficiently reduced. In addition, it can be seen that the air gap length can be shortened, thereby increasing the torque output with respect to the magnet usage.

Further, with the use of the permanent magnet rotary electric machine 1 of this embodiment for the EPS device, it is possible to suppress vibration and noise propagating in the vehicle interior. In addition, vibration and noise can be suppressed by applying the invention to other electric auxiliary equipment for automobiles, for example, an electric auxiliary equipment for automobile which performs electric braking. Furthermore, the application of the permanent magnet rotary electric machine 1 of this embodiment is not limited to the field of automobiles, but can be applied to all industrial permanent magnet rotary electric machines for which low vibration is preferable.

Second Embodiment

Figure 5A:
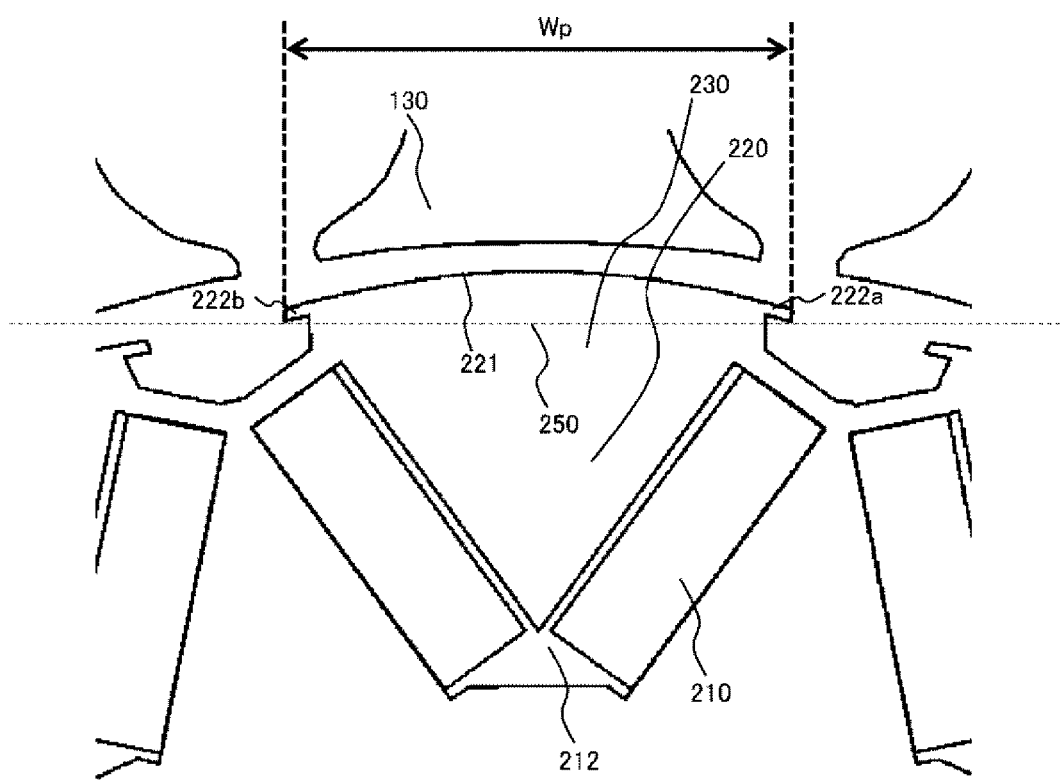
FIG. 5A is an enlarged view of the vicinity of a magnetic pole of a cross section of a rotor according to a second embodiment of the invention.
Figure 5B:
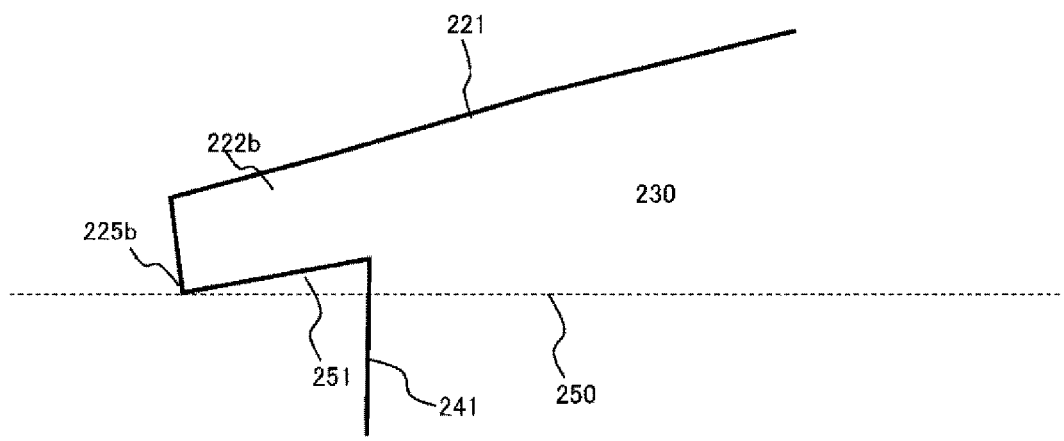
FIG. 5B is an enlarged view of the vicinity of a protruding end of the rotor according to the second embodiment of the invention.

Next, the permanent magnet rotary electric machine 1 according to a second embodiment of the invention will be described with reference to FIGS. 5A and 5B. FIG. 5A is an enlarged view of the vicinity of a magnetic pole of a cross section of the rotor 20 according to the second embodiment, and corresponds to FIG. 3 described in the first embodiment. FIG. 5B is an enlarged view of the vicinity of the protrusion end in the second embodiment, and is an enlarged view of a portion including the second protrusion 222b of the base 230. Further, the description of common portions to the first embodiment is partially omitted.

The magnetic pole 220 in the permanent magnet rotary electric machine 1 of this embodiment has a structure as illustrated in FIGS. 5A and 5B. In this structure, similarly to the first embodiment, the magnetic pole 220 includes the first protrusion 222a and the second protrusion 222b, but the shapes thereof are different from those of the first embodiment. Specifically, as illustrated in FIGS. 5A and 5B, if a virtual line segment connecting the end of the first protrusion 222a and a second protrusion end 225b, which is the end of the second protrusion 222b, is defined as a first line segment 250, the surface between the second protrusion end 225b and the side surface portion 241 is located on the outer diameter side of the first line segment 250. Thus, the second protrusion 222b is formed between the first line segment 250 and the second protrusion 222b such that a space 251 facing the first line segment 250 is provided. Further, the first protrusion 222a has the same shape.

Figure 6:
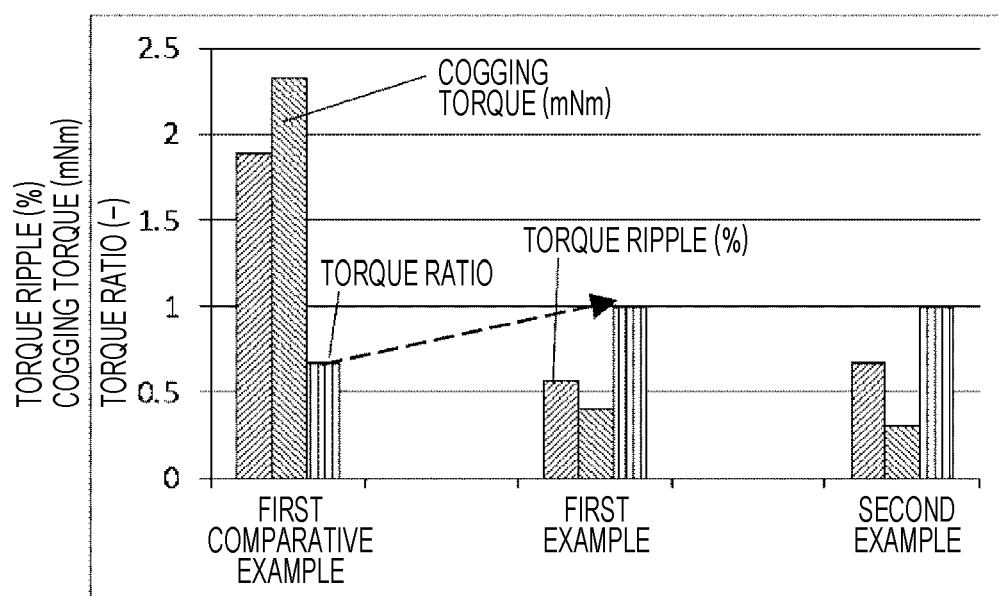
FIG. 6 is a diagram for describing a difference in torque ripple between first and second examples according to the invention and the first comparative example.

FIG. 6 is a diagram for describing a difference in torque ripple between the first and second examples according to the invention and the first comparative example. FIG. 6 illustrates the torque ripple and the cogging torque of the first comparative example (the IPM rotary electric machine having a general structure of a semi-cylindrical magnetic pole shape as illustrated in FIG. 4) and the first and second examples of the invention, and also illustrates the torque ratio of the first comparative example and the first example when the torque of the second example is set to 1. In addition, the values of the torque ripple and the cogging torque in each example illustrated in FIG. 6 are obtained by calculating the magnetic flux distribution of the stator 10, the rotor 20, and the air gap 30 and the electromagnetic stress of the air gap 30 by a magnetic field analysis using a finite element method, and calculating the torque corresponding to the rotation angle. Further, the first example corresponds to the permanent magnet rotary electric machine 1 of the first embodiment having the magnetic pole structure illustrated in FIG. 3, and the second example corresponds to the permanent magnet rotary electric machine 1 of the second embodiment having the magnetic pole structure illustrated in FIG. 5A.

In a case where the air gap length is 0.5 mm, as illustrated in FIG. 6, the torque ripple of the first example is 0.56%, and the torque ripple of the second example is 0.68%. Therefore, it can be seen that the object of the invention can be achieved. On the other hand, since the torque ripple of the first comparative example is as large as 1.9% as compared with these numerical values, it can be seen that it is difficult to achieve the object of the invention.

In addition, as illustrated in FIG. 6, the cogging torque of the first example is 0.4 mN·m, and the cogging torque of the second example is 0.3 mN·m, so that it can be seen that the cogging torque is sufficiently small. On the other hand, the cogging torque of the first comparative example is 2.34 mN·m, and it can be seen that the cogging torque is not sufficiently reduced in consideration of the influence of the manufacturing error and the like. Further, as illustrated in FIG. 6, the torque ratio based on the second example is almost 1 in the first example, but is 0.68 in the first comparative example. In the first comparative example, it is difficult to achieve the objective which is small and has a large torque output.

In the rotary electric machine having the conventional structure such as the first comparative example, the protrusion 222 described in the first and second embodiments is not provided on the magnetic pole, so that the magnetic field at the magnetic pole tip becomes hard or easy to pass at the pole tips. In particular, when the air gap is small, the change in the magnetic field near the magnetic pole tip becomes large. As a result, the magnetic field from the rotor deviates from a sinusoidal shape, and it is considered that the torque ripple increases. On the other hand, in the first and second examples, with the protrusion 222, the torque ripple is reduced as compared with the first comparative example.

From the above comparative study, the configurations of the first and second examples are excellent in all aspects of torque ripple, cogging torque, and torque ratio, and are effective. In other words, the structure of the permanent magnet rotary electric machine 1 according to the invention is a structure effective for reducing the torque ripple.

Further, even in this embodiment, similarly to the first embodiment, with the use of the permanent magnet rotary electric machine 1 of this embodiment for the EPS device, it is possible to suppress vibration and noise propagating in the vehicle interior. In addition, vibration and noise can be suppressed by applying the invention to other electric auxiliary equipment for automobiles, for example, an electric auxiliary equipment for automobile which performs electric braking. Furthermore, the application of the permanent magnet rotary electric machine 1 of this embodiment is not limited to the field of automobiles, but can be applied to all industrial permanent magnet rotary electric machines for which low vibration is preferable.

Third Embodiment

Figure 7A:
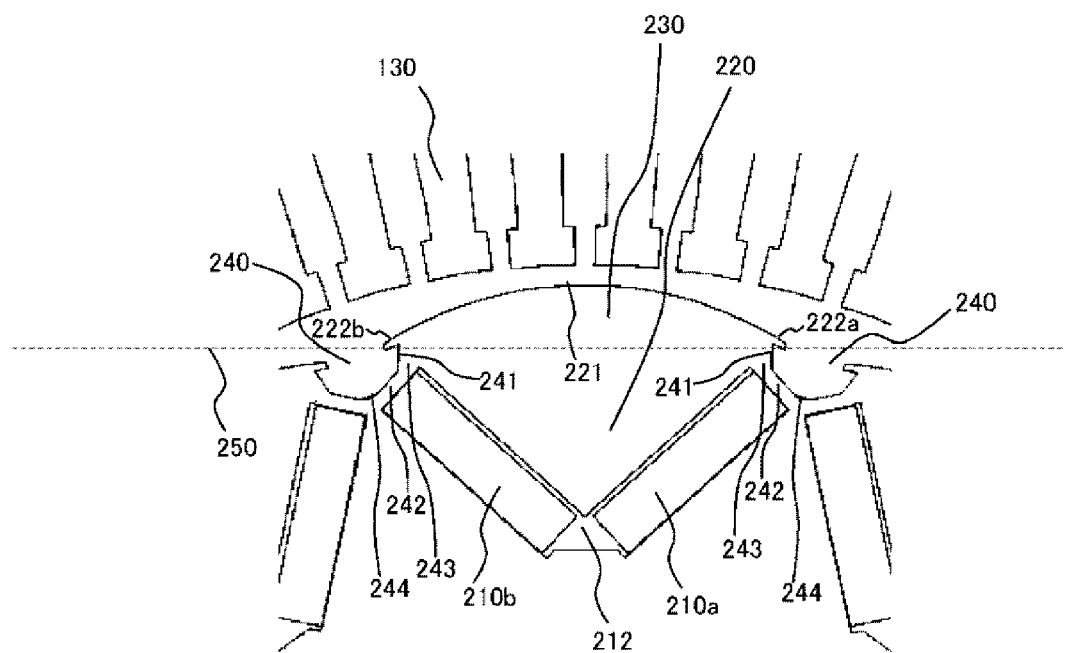
FIG. 7A is an enlarged view of the vicinity of a magnetic pole of a cross section of a rotor according to a third embodiment of the invention.

Next, the permanent magnet rotary electric machine 1 according to a third embodiment of the invention will be described using FIG. 7A. FIG. 7A is an enlarged view of the vicinity of the magnetic pole of the cross section of the rotor 20 according to the third embodiment, and corresponds to FIGS. 3 and 5 described in the first and second embodiments, respectively. Further, the description of parts common to the first and second embodiments is partially omitted.

Although the permanent magnet rotary electric machine 1 described in the first embodiment is a rotating machine of 14 poles and 18 slots concentrated winding, the permanent magnet rotary electric machine 1 of this embodiment is a rotating machine of 10 poles and 60 slots distributed winding. The stator 10 of this embodiment is formed, for example, as follows. First, a plurality of radial teeth 130 are formed on the inner peripheral side by a stator core laminated body in which integral punched cores of electromagnetic steel sheets are laminated. Next, a winding is wound around each of the teeth 130 to form the winding 140, which is then shrink-fitted or press-fitted into a housing (not illustrated) to be integrated. Thus, the stator 10 is formed.

The magnetic pole 220 in the permanent magnet rotary electric machine 1 of this embodiment has a structure similar to that of the second embodiment, as illustrated in FIG. 7A. In other words, the magnetic pole 220 includes the first protrusion 222a and the second protrusion 222b, and the surface between the end of the first protrusion 222a (the second protrusion 222b) and the side surface portion 241 is located on the outer diameter side from the first line segment

250. With this configuration, the first protrusion 222*a* and the second protrusion 222*b* are formed such that spaces are provided between the first line segment 250 and the first protrusion 222*a* and the second protrusion 222*b*, respectively.

As a result of calculation of the characteristics of the permanent magnet rotary electric machine 1 of this embodiment by magnetic field analysis, the torque ripple has been 0.82%. With this configuration, it can be seen that even in the rotary electric machine having 10 poles and 60 slots distributed winding, the characteristic that the torque ripple is small can be obtained. In addition, the cogging torque can be sufficiently reduced to 0.3 mN·m. Therefore, it has been confirmed that the invention is also effective in a combination of pole slots other than the 14-pole 18-slot concentrated winding and the winding method. Further, the above torque ripple and cogging torque are calculated by the same method as in FIG. 6, with the air gap length set to 0.7 mm.

Fourth Embodiment

Figure 7B:
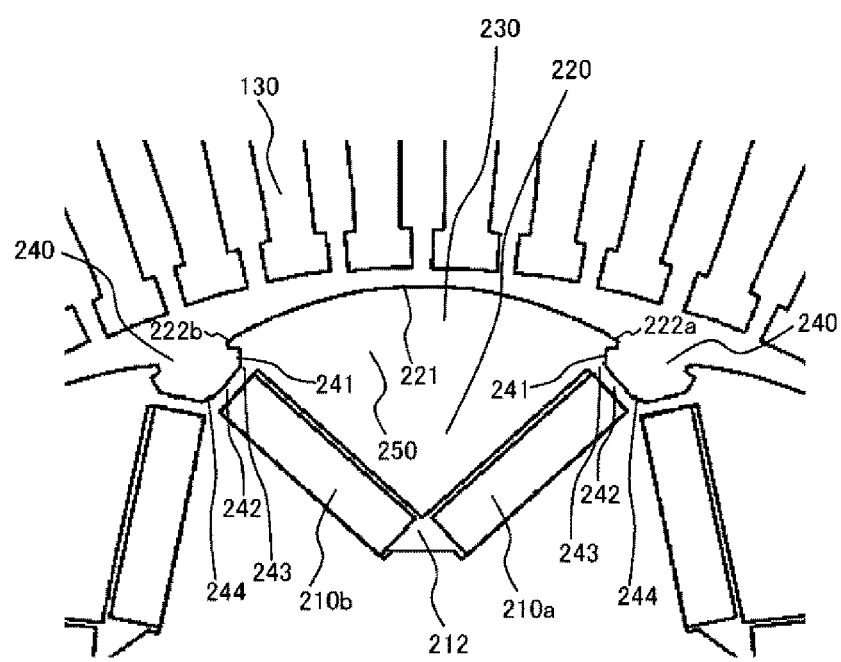
FIG. 7B is an enlarged view of the vicinity of a magnetic pole of a cross section of a rotor according to a fourth embodiment of the invention.

Next, the permanent magnet rotary electric machine 1 according to a fourth embodiment of the invention will be described using FIG. 7B. The permanent magnet rotary electric machine 1 according to this embodiment is a rotary electric machine having 10 poles and 60 slots distributed winding, similarly to the third embodiment. FIG. 7B is an enlarged view of the vicinity of the magnetic pole of the cross section of the rotor 20 according to the fourth embodiment, and corresponds to FIGS. 3, 5, and 7A described in the first to third embodiments, respectively. Further, the description of parts common to the first to third embodiments will be partially omitted.

The magnetic pole 220 in the permanent magnet rotary electric machine 1 of this embodiment has a structure similar to that of the first embodiment, as illustrated in FIG. 7B. In other words, the magnetic pole 220 includes the first protrusion 222*a* and the second protrusion 222*b* having the same shape as that illustrated in FIG. 3.

As a result of calculation of the characteristics of the permanent magnet rotary electric machine 1 of this embodiment by magnetic field analysis, the torque ripple has been 0.85%. With this configuration, it can be seen that even in the rotary electric machine having 10 poles and 60 slots distributed winding, the characteristic that the torque ripple is small can be obtained. In addition, the cogging torque can be sufficiently reduced to 0.8 mN·m. Therefore, it has been confirmed that the invention is also effective in a combination of pole slots other than the 14-pole 18-slot concentrated winding and the winding method. Further, the above torque ripple and cogging torque are calculated by the same method as in FIG. 6, with the air gap length set to 0.7 mm.

Fifth Embodiment

Figure 8A:
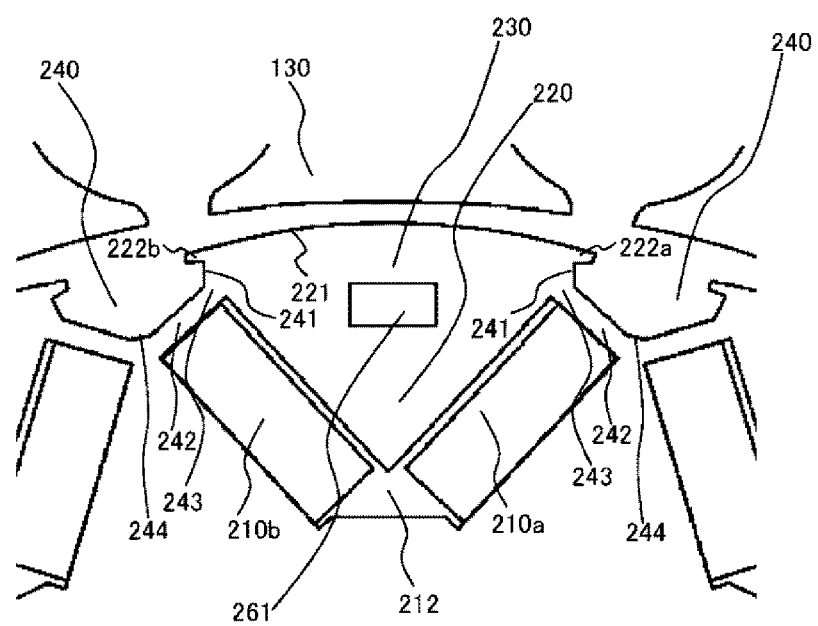
FIG. 8A is an enlarged view in the vicinity of a magnetic pole of a first plate in a rotor according to a fifth embodiment of the invention.
Figure 8B:
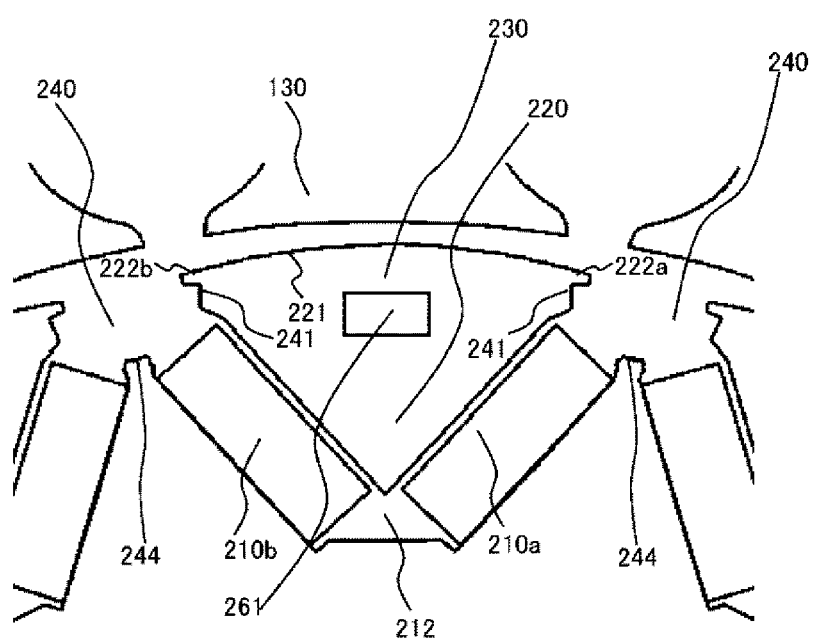
FIG. 8B is an enlarged view of the vicinity of a magnetic pole of a second plate in the rotor according to the fifth embodiment of the invention.
Figure 8C:
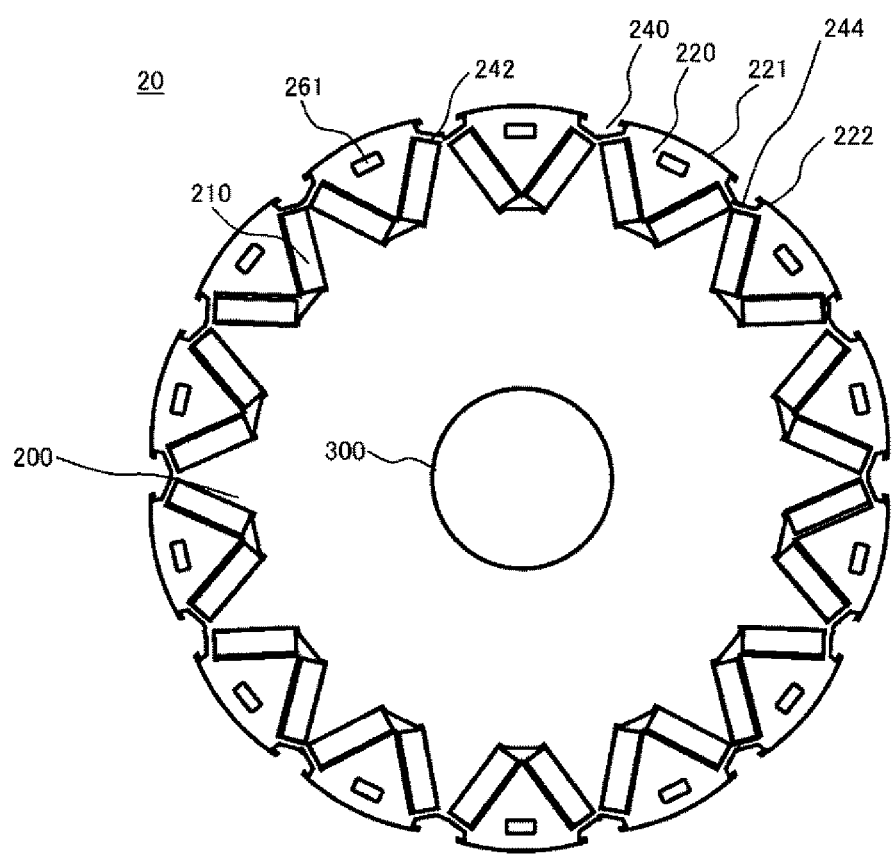
FIG. 8C is a cross-sectional view of an end surface of an axial direction of the rotor according to the fifth embodiment of the invention.

Next, the permanent magnet rotary electric machine 1 according to a fifth embodiment of the invention will be described using FIGS. 8A to 9. The permanent magnet rotary electric machine 1 of this embodiment is a rotary electric machine having 14 poles and 18 slots concentrated winding, similarly to the first and second embodiments. FIGS. 8A, 8B, 8D, 8E, and 8F are enlarged views of the vicinity of the magnetic pole of the cross section of the rotor 20 according to the fifth embodiment, and correspond to FIGS. 3, 5, 7A, and 7B described in the first to fourth embodiments, respectively. FIG. 8C is a cross-sectional view of the end surface in the axial direction of the rotor according to the fifth embodiment. Further, the description of parts common to the first to fourth embodiments will be partially omitted.

As described in the first embodiment, the rotor core 200 in the permanent magnet rotary electric machine 1 of this embodiment is configured by laminating a plurality of electromagnetic steel sheets in the axial direction. The plurality of electromagnetic steel sheets are classified into those having the shape illustrated in FIG. 8A and those having the shape illustrated in FIG. 8B. Hereinafter, the electromagnetic steel sheet having the shape illustrated in FIG. 8A will be referred to as a "first plate", and the electromagnetic steel sheet having the shape illustrated in FIG. 8B will be referred to as a "second plate". In other words, the rotor core 200 of this embodiment is configured by laminating a plurality of first plates and a plurality of second plates. The first plate and the second plate are fastened to each other in the axial direction by an axial fastening portion 261.

As illustrated in FIG. 8A, the first plate has a magnetic pole structure similar to that described in the first embodiment. In other words, the magnetic pole 220 of the first plate includes the first protrusion 222*a* and the second protrusion 222*b* having the same shape as that illustrated in FIG. 3, and is connected to the bridge 242 formed between the first space 240 and the storage space 212 in the connecting portion 243. On the other hand, as illustrated in FIG. 8B, the bridge 242 is not formed between the first space 240 and the storage space 212 in the second plate. For this reason, an opening penetrating between the storage space 212 and the first space 240 is formed between the magnetic pole 220 and the q-axis outer peripheral portion 244. Further, the first plate and the second plate may be manufactured in separate manufacturing steps, or the second plate may be manufactured by cutting off the bridge 242 from the first plate.

As illustrated in FIG. 8C, the first plate having a bridge 242 is arranged on the end surface in the axial direction of the rotor core 200 of this embodiment. FIG. 8C differs from the cross-sectional view of FIG. 2 described in the first embodiment in that the magnetic pole 220 is provided with the axial fastening portion 261. The plurality of electromagnetic steel sheets forming the rotor core 200, that is, the plurality of first and second plates, are laminated by being mutually fastened in the axial direction by a fastening shaft (not illustrated) inserted into the axial fastening portion 261. Therefore, the permanent magnet 210 stored in the storage space 212 is held in the rotation plane by the bridge 242 of the first plate, and is connected to the laminated body of the rotor core 200.

In the rotor core 200 of this embodiment, by reducing the first plate and increasing the second plate as long as there is no problem in the strength at the time of rotation, the leakage of the magnetic flux passing through the bridge 242 is reduced, so that the torque can be increased. However, since there may be a case where one laminated plate on the axial end surface is removed in order to adjust the thickness at the time of assembly, the number of laminated first plates at the end in the axial direction at the start of assembly is desirably 2 or more at least at one end.

Figure 8D:
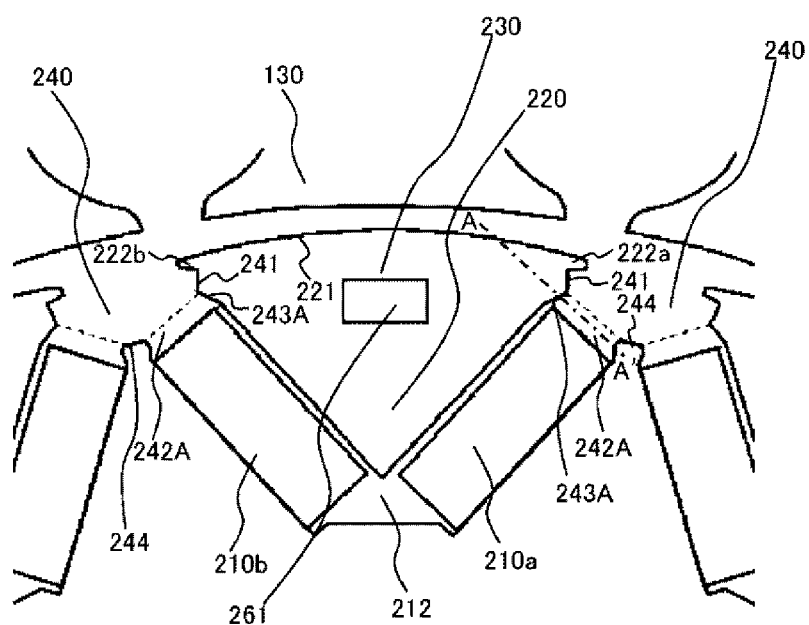
FIG. 8D is a diagram illustrating a partially connected bridge in the rotor according to the fifth embodiment of the invention.

As described above, the rotor core 200 of this embodiment has a structure in which the plurality of first plates and second plates are fastened and laminated in the axial direction. Here, the difference between the first plate and the second plate is only the presence or absence of the bridge 242. Therefore, in the rotor core 200 of this embodiment, as illustrated in FIG. 8D, the bridge 242 is partially connected to form a three-dimensional structure having a thickness in the axial direction. Further, in FIG. 8D, the projection of the partially connected bridge 242 in the axial direction is illustrated by a partially connected bridge 242A indicated by a broken line. The magnetic pole 220 is connected to the partially connected bridge 242A at a partially connecting portion 243A.

According to this embodiment, since the bridge 242 is configured by the partially connected bridge 242A, magnetic flux leakage at this portion is reduced. Therefore, when obtaining the same torque as in the first embodiment with the same lamination thickness, the width of the polar surface of the permanent magnet 210 can be reduced, and the magnet amount can be further reduced.

Figure 8E:
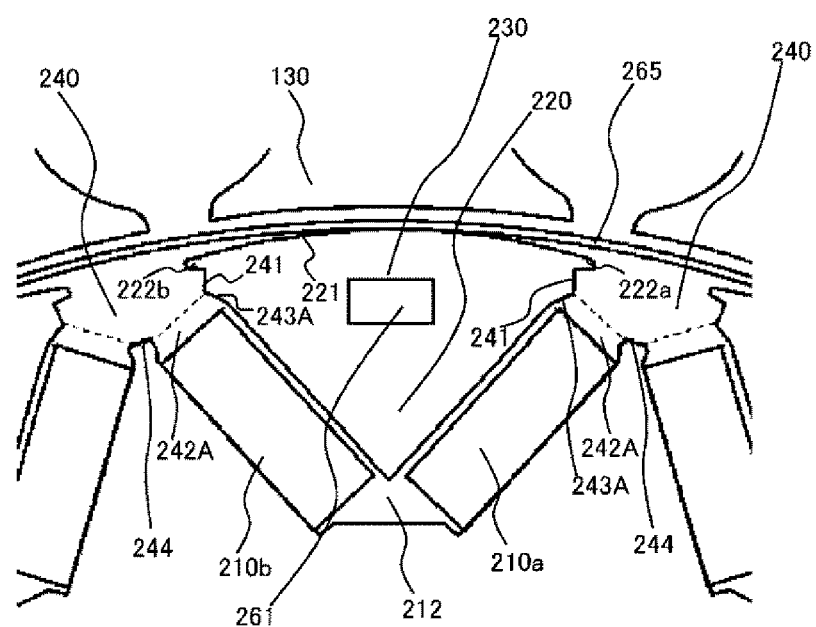
FIG. 8E is a diagram illustrating a cover which covers a rotor core according to the fifth embodiment of the invention.
Figure 8F:
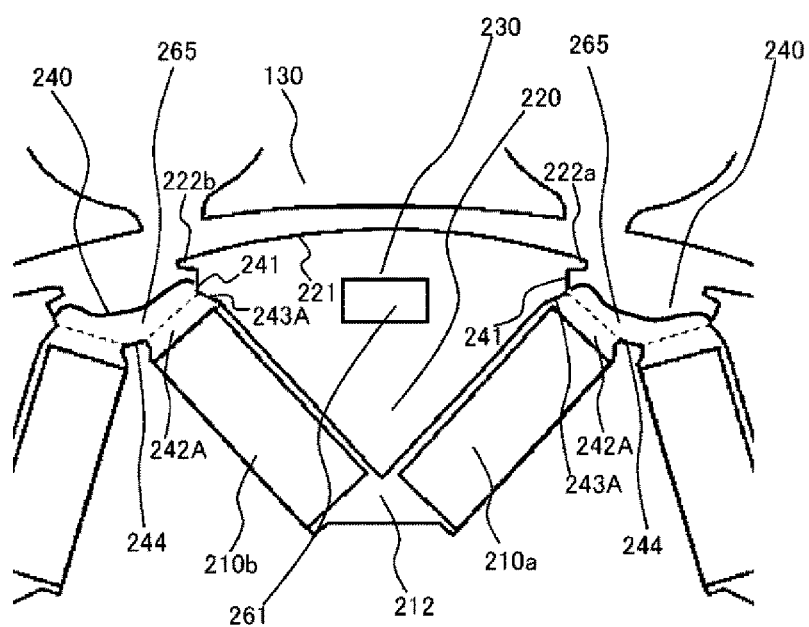
FIG. 8F is a diagram illustrating the cover which covers the rotor core according to the fifth embodiment of the invention.

Further, in the rotor core 200 of this embodiment, in order to prevent scattering of the permanent magnet 210, it is preferably provided a cover which can cover an opening penetrating between the storage space 212 and the first space 240 at least in the second plate. For example, as illustrated in FIG. 8E, a cover 265 which covers the surface of the rotor core 200 including the magnetic pole 220 and the first space 240 in the entire circumferential direction may be used. As a material of the cover 265, for example, a non-magnetic metal or a synthetic resin may be used. In addition, as illustrated in FIG. 8F, for example, an adhesive or a synthetic resin may be applied to the first space 240 and used as the cover 265. In this case, it is preferable to apply an adhesive or a synthetic resin also to the end in the axial direction of the rotor 20 adjacent to the first space 240, and to solidify the adhesive or the resin in a shape which covers the periphery of each magnetic pole 220. With this configuration, the cover 265 made of an adhesive or a synthetic resin is prevented from peeling off, and the scattering of the permanent magnet 210 can be prevented. In addition, at least one of the surface of the permanent magnet 210 and the surface of the cover 265 in the end surface in the axial direction of the rotor 20 may be arranged and covered with an end plate. With this configuration, it possible to further prevent the permanent magnet 210 from scattering.

Figure 9:
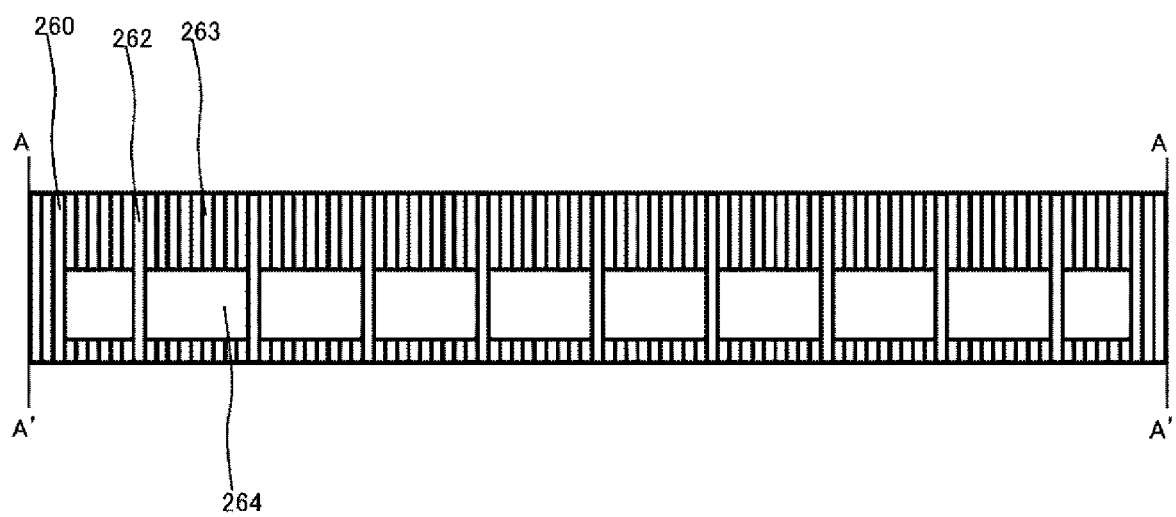
FIG. 9 is a diagram illustrating an example of arrangement of the first plate and the second plate in the rotor core according to the fifth embodiment of the invention.

FIG. 9 is a diagram illustrating an example of an arrangement in the axial direction of the first plate and the second plate in the rotor core 200 according to the fifth embodiment. FIG. 9 illustrates an example of the arrangement of the first plate and the second plate in a cross section taken along line A-A' of FIG. 8D.

As illustrated in FIG. 8D, the magnetic pole 220 of this embodiment includes the partially connected bridge 242A to which the bridges 242 are partially connected. Therefore, the arrangement of the first plate and the second plate in the A-A' cross section is as illustrated in FIG. 9, for example. In FIG. 9, the plurality of first plates 262 are arranged at both ends in the axial direction, and are arranged at regular intervals except at both ends. The plurality of second plates 263 are arranged between the first plates 262 arranged at regular intervals. In other words, the lamination ratio of the first plate 262 in the plurality of laminated plates of the rotor core 200 is higher at both ends than at the center in the axial direction. The first plate 262 and the second plate 263 are arranged such that the lamination ratio of the first plate 262 is uniform. In addition, the first plate 262 includes a smaller number of arrangements than the second plate 263, and an opening 264 penetrating the first space 240 and the storage space 212 is formed in a portion of the second plate 263 where the bridge 242 is not provided.

According to this embodiment, the rigidity of the rotor core 200 at the end in the axial direction is increased while reducing the leakage of the magnetic flux passing through the bridge 242 and increasing the torque, so that the strength of the integrated rotor core 200 can be ensured. Further, in this embodiment, the ratio of the number of laminated first plates in all the laminated plates is set to 0.15, but may be set to another ratio.

Sixth Embodiment

Figure 10:
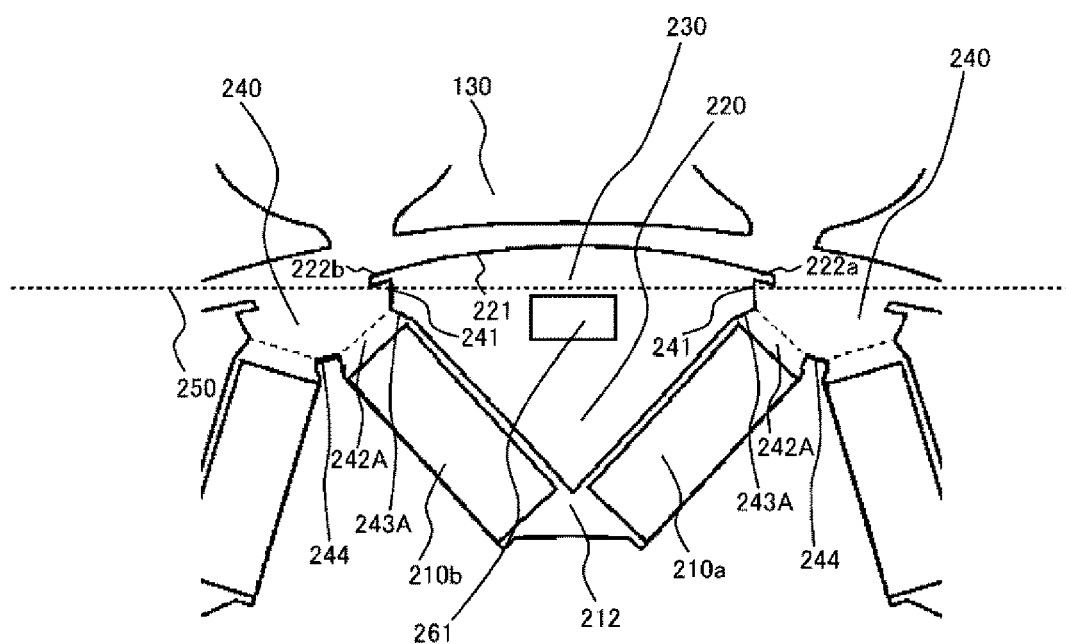
FIG. 10 is an enlarged view in the vicinity of a magnetic pole of a cross section of a rotor according to a sixth embodiment of the invention.

Next, the permanent magnet rotary electric machine 1 according to a sixth embodiment of the invention will be described with reference to FIG. 10. FIG. 10 is an enlarged view of the vicinity of the magnetic pole of the cross section of the rotor 20 according to the sixth embodiment, and corresponds to FIG. 8D described in the fifth embodiment. As described in the fifth embodiment, the rotor core 200 of this embodiment includes the first plate having a bridge 242 and the second plate having no bridge 242, each of which is laminated in plural. In other words, as illustrated in FIG. 10, the bridges 242 are partially connected to form a three-dimensional structure having a thickness in the axial direction. Further, in FIG. 10, the projection of the partially connected bridge 242 in the axial direction is illustrated by the partially connected bridge 242A indicated by a broken line. The magnetic pole 220 is connected to the partially connected bridge 242A at a partially connecting portion 243A.

In addition, in the permanent magnet rotary electric machine 1 of this embodiment, the magnetic pole 220 has the same structure as in the second and third embodiments, as illustrated in FIG. 10. In other words, the magnetic pole 220 includes the first protrusion 222a and the second protrusion 222b, and the surface between the end of the first protrusion 222a (the second protrusion 222b) and the side surface portion 241 is located on the outer diameter side from the first line segment 250. With this configuration, the first protrusion 222a and the second protrusion 222b are formed such that spaces are provided between the first line segment 250 and the first protrusion 222a and the second protrusion 222b, respectively.

In the configuration of this embodiment, similarly to the fifth embodiment, the bridge 242 is configured by the partially connected bridge 242A, so that magnetic flux leakage in this portion is reduced. Therefore, when obtaining the same torque as in the second embodiment with the same thickness, the width of the polar surface of the permanent magnet 210 can be reduced, so that the magnet amount can be further reduced. Further, in this embodiment, it is preferable to provide the cover 265 described with reference to FIGS. 8E and 8F to prevent the permanent magnets 210 from scattering, similarly to the fifth embodiment.

Figure 11:
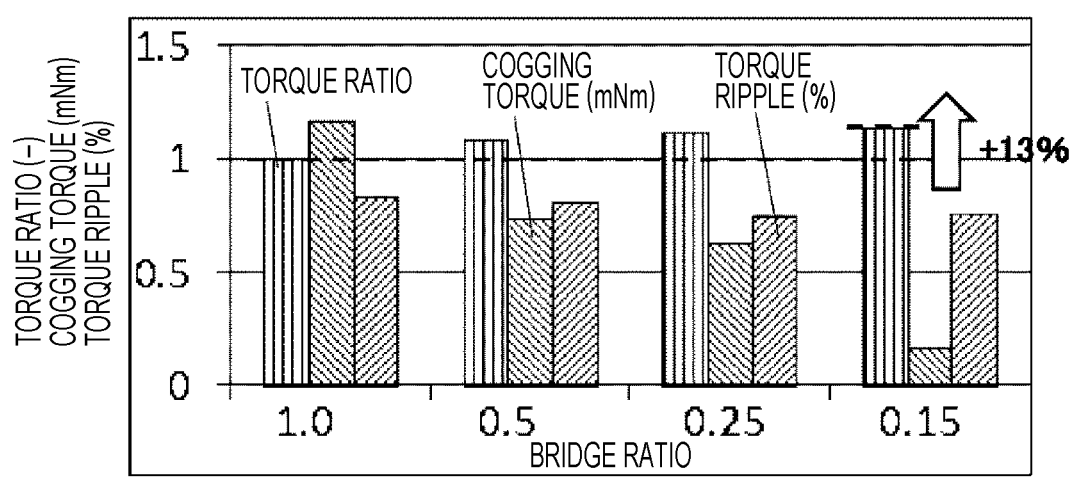
FIG. 11 is a diagram illustrating a comparison of a torque ratio, a cogging torque, and a torque ripple with respect to a lamination ratio of the first plates in a plurality of laminated plates of a rotor core according to the sixth embodiment of the invention.

FIG. 11 is a diagram illustrating a comparison of a torque ratio, a cogging torque, and a torque ripple with respect to a lamination ratio of the first plate in a plurality of laminated plates constituting the rotor core 200 of this embodiment. Hereinafter, the effects of this embodiment will be described with reference to FIG. 11. FIG. 11 illustrates the torque ripple and the cogging torque in each case where the lamination ratio of the first plate is 1.0, 0.5, 0.25, and 0.15, and a torque ratio when the torque in a case where the lamination ratio of the first plate is 1.0 is set to 1. Further, the torque ripple and cogging torque in FIG. 11 are calculated in the same manner as in FIG. 6, with the air gap length set to 0.5 mm.

As illustrated in FIG. 11, the torque ripple is reduced from 0.83% in a case where the lamination ratio of the first plate is 1.0 to 0.75% in a case where the lamination ratio of the first plate is 0.15 as the lamination ratio of the first plate decreases. In any case, the torque ripple is sufficiently small, indicating that the object of the invention can be achieved.

In addition, the torque ratio is 1.13 in a case where the lamination ratio of the first plate is 0.15, compared to a case where the lamination ratio of the first plate is 1.0, and increases as the lamination ratio of the first plate decreases. With this configuration, it can be seen that the rotor core 200 of this embodiment increases the torque due to the effect of the partial connection of the bridge, and has a configuration suitable for reducing torque ripple in a small and large torque permanent magnet rotary electric machine. In addition, the cogging torque is reduced from 1.17 mN·m in a case where the lamination ratio of the first plate is 1.0 to 0.16 mN·m in a case where the lamination ratio of the first plate is 0.15 as the lamination ratio of the first plate decreases. In any case, it can be seen that the cogging torque is sufficiently small.

Figure 12:
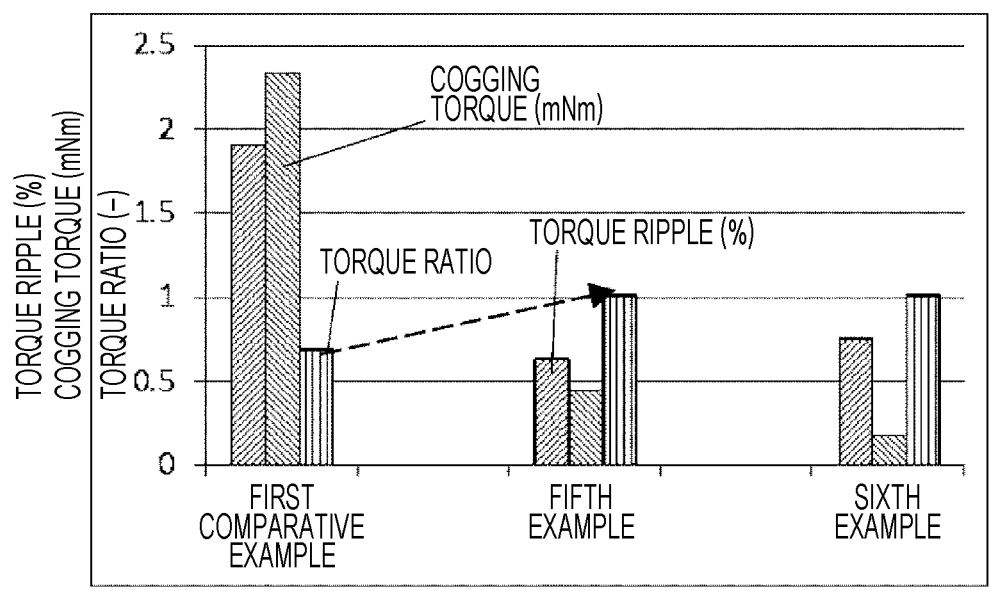
FIG. 12 is a diagram for describing a difference in torque ripple between fifth and sixth examples according to the invention and the first comparative example.

FIG. 12 is a diagram for describing a difference in torque ripple between the fifth and sixth examples according to the invention and the first comparative example. FIG. 12 illustrates the torque ripple and the cogging torque of the first comparative example (the IPM rotary electric machine having a general structure of a semi-cylindrical magnetic pole shape as illustrated in FIG. 4 described above) and the fifth and sixth examples of the invention, and also illustrates the torque ratio of the first comparative example and the fifth example when the torque of the sixth example is set to 1. Further, the fifth example corresponds to the permanent magnet rotary electric machine 1 of the fifth embodiment having the magnetic pole structure illustrated in FIG. 8D, and the sixth example corresponds to the permanent magnet rotary electric machine 1 of the sixth embodiment having the magnetic pole structure illustrated in FIG. 10. In addition, the torque ripple and cogging torque in each example illustrated in FIG. 12 are calculated in the same manner as in FIG. 6, with the air gap length set to 0.5 mm.

As illustrated in FIG. 12, the torque ripple of the fifth example is 0.63%, and the torque ripple of the sixth example is 0.75%. Therefore, it can be seen that the object of the invention can be achieved. On the other hand, since the torque ripple of the first comparative example is as large as 1.9% as compared with these numerical values, it can be seen that it is difficult to achieve the object of the invention.

In addition, as illustrated in FIG. 12, the torque ratio based on the sixth example is almost 1 in the fifth example, but is 0.68 in the first comparative example. With this configuration, it can be seen that, in comparison with the first comparative example, a permanent magnet rotary electric machine having a small size and a large torque output can be realized in the fifth and sixth examples. Further, as illustrated in FIG. 12, the cogging torque of the fifth example is 0.43 mN·m, and the cogging torque of the sixth example is 0.17 mN·m, so that it can be seen that both cogging torques are sufficiently small. On the other hand, the cogging torque of the first comparative example is 2.34 mN·m, and it can be seen that the cogging torque is not sufficiently reduced in consideration of the influence of the manufacturing error and the like.

As described above, the configurations of the fifth and sixth examples according to the invention have a great effect on a general configuration.

Figure 13:
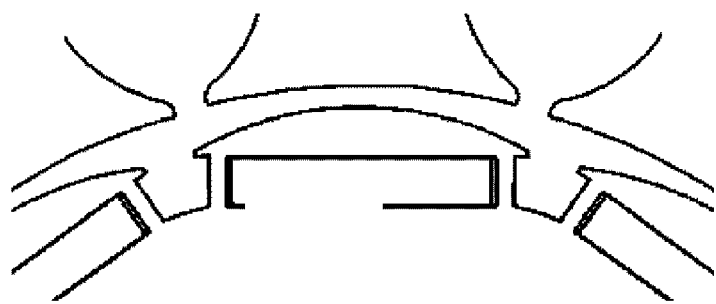
FIG. 13 is a diagram illustrating a second comparative example.
Figure 14:
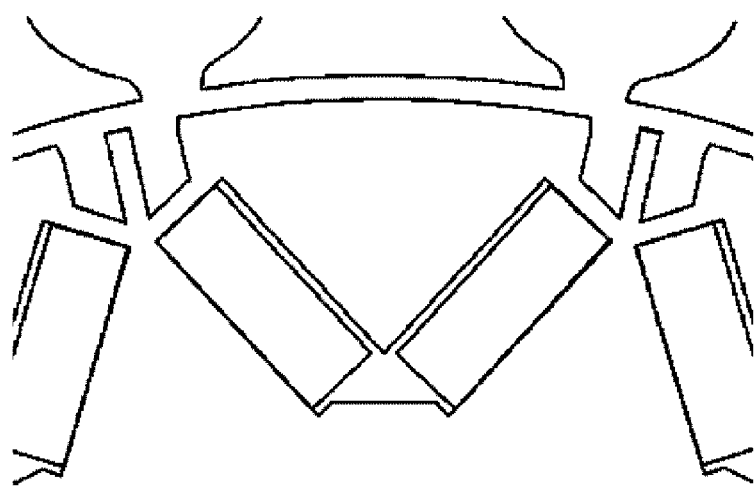
FIG. 14 is a diagram illustrating a third comparative example.
Figure 15:
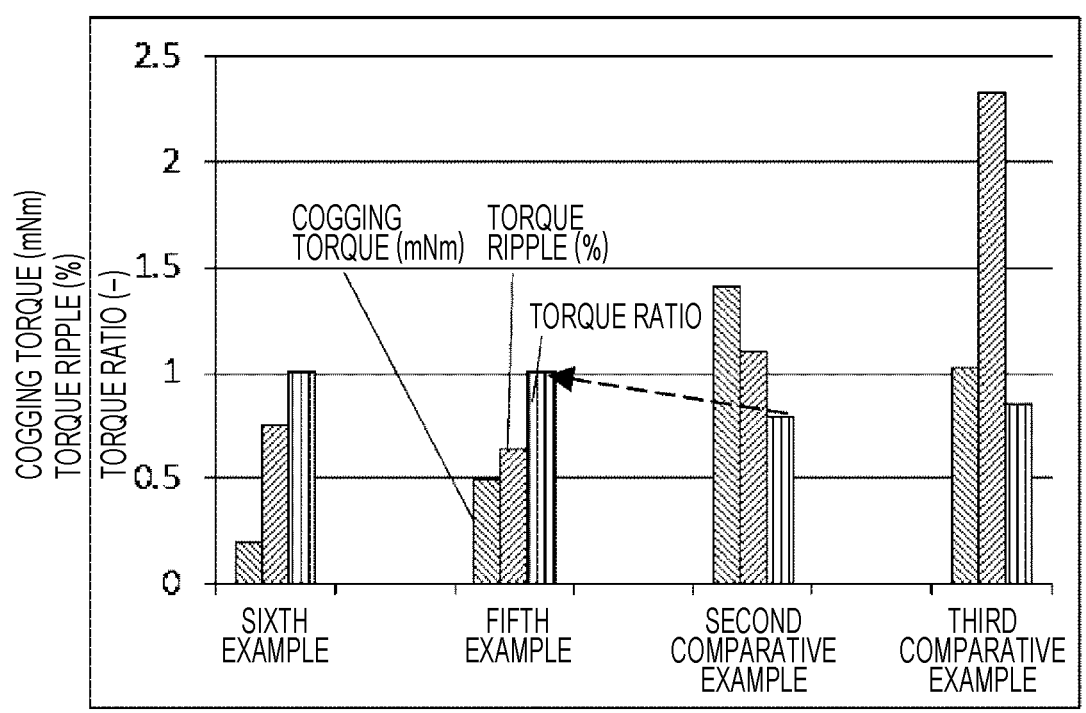
FIG. 15 is a diagram for describing a difference in torque ripple between the fifth and sixth examples according to the invention and the second and third comparative examples.

FIG. 15 is a diagram for describing a difference in torque ripple between the fifth and sixth examples according to the invention and the second and third comparative examples. FIG. 15 illustrates the torque ripple and the cogging torque of the second and third comparative examples (the IPM rotary electric machines having a magnetic pole shape as illustrated in FIGS. 13 and 14 respectively) and the fifth and sixth examples of the invention, and also illustrates the torque ratio of the second and third comparative examples and the fifth example when the torque of the sixth example is set to 1. In the second comparative example illustrated in FIG. 13, the magnet is arranged substantially parallel to the circumferential direction, and includes protrusions at both ends of the magnetic pole. The third comparative example illustrated in FIG. 14 has a VIPM structure in which the ends of the magnetic poles are formed in a slightly oblique semi-cylindrical shape, and the bottom of the space between the magnetic poles protrudes in the q-axis direction. Further, the fifth and sixth examples are the same as those described with reference to FIG. 12. In addition, the torque ripple and cogging torque in each example illustrated in FIG. 15 are calculated in the same manner as in FIG. 6, with the air gap length set to 0.5 mm.

As illustrated in FIG. 15, the torque ripple of the fifth example is 0.63%, and the torque ripple of the sixth example is 0.75%. Therefore, it can be seen that the object of the invention can be achieved. On the other hand, the torque ripple of the second comparative example is 1.1%, and the reduction of the torque ripple is somewhat insufficient. In addition, the torque ripple of the third comparative example is as large as 2.32%. Therefore, it can be seen that it is difficult to achieve the object of the invention.

In addition, as illustrated in FIG. 15, the torque ratio based on the sixth example is almost 1 in the fifth example, but is 0.79 in the second comparative example and 0.85 in the third comparative example. With this configuration, it can be seen that, in comparison with the second and third comparative examples, a permanent magnet rotary electric machine having a small size and a large torque output can be realized in the fifth and sixth examples. Further, as illustrated in FIG. 15, the cogging torque of the fifth example is 0.49 mN·m, and the cogging torque of the sixth example is 0.17 mN·m, so that it can be seen that both cogging torques are sufficiently small. On the other hand, the cogging torque of the second comparative example is 1.4 mN·m, and 1.02 mN·m in the third comparative example. It can be seen that the cogging torque is not sufficiently reduced.

As described above, the configurations of the fifth example and the sixth example according to the invention have a great effect in reducing the torque ripple and the cogging torque even in the configuration of a semi-cylindrical magnetic pole shape having protrusions at both ends of the magnetic pole as in the second comparative example, and the configuration of a shape in which the core outermost peripheral portion in the q-axis direction protrudes from the side surface portion of the magnetic pole in the third comparative example. Therefore, it is possible to realize a permanent magnet rotary electric machine which is effective in reducing the torque ripple as the object of the invention, is small, has a large torque output, and has a small cogging torque.

Seventh Embodiment

Figure 16:
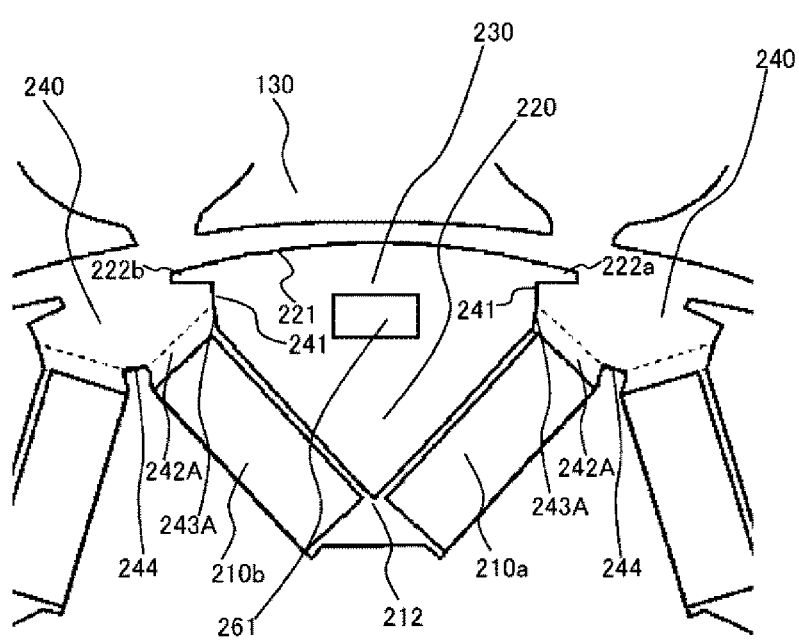
FIG. 16 is an enlarged view of the vicinity of a magnetic pole of a cross section of a rotor according to a seventh embodiment of the invention.

Next, the permanent magnet rotary electric machine 1 according to a seventh embodiment of the invention will be described with reference to FIG. 16. FIG. 16 is an enlarged view of the vicinity of the magnetic pole of the cross section of the rotor 20 according to the seventh embodiment, and corresponds to FIG. 8D described in the fifth embodiment. In the rotor core 200 of this embodiment, as illustrated in FIG. 16, the width of the base 230 of the magnetic pole 220 is shorter than that of the fifth embodiment. The other points are the same as in the fifth embodiment. In other words, as illustrated in FIG. 16, the first plate having the bridge 242 and the second plate not having the bridge 242 are each formed by laminating in plural each, so that the bridge 242 is partially connected to form a three-dimensional structure with a thickness in the axial direction. Further, in FIG. 16, the projection of the partially connected bridge 242 in the axial direction is illustrated by the partially connected bridge 242A indicated by a broken line. The magnetic pole 220 is connected to the partially connected bridge 242A at a partially connecting portion 243A.

Figure 17:
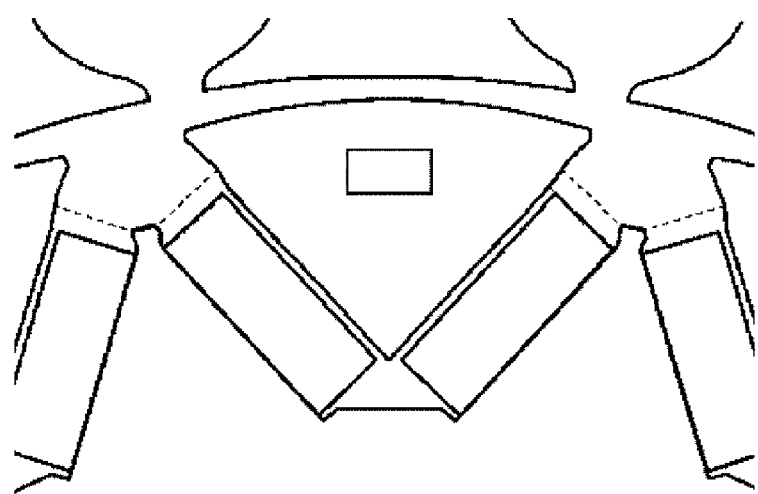
FIG. 17 is a diagram illustrating a fourth comparative example.
Figure 18:
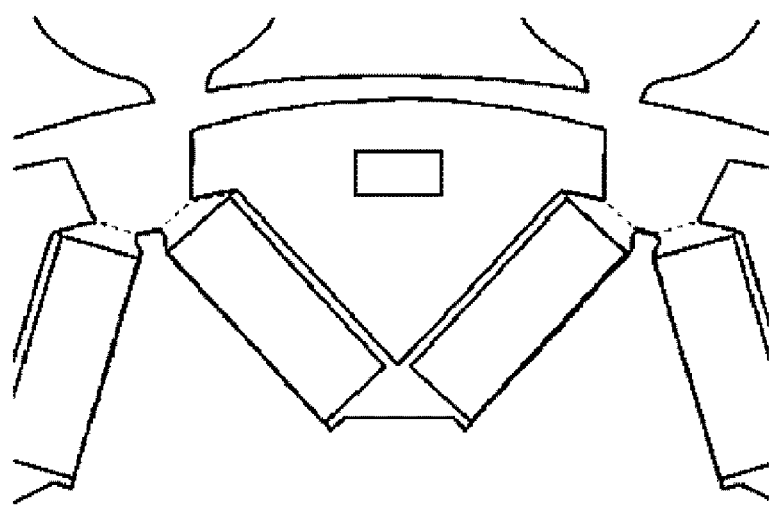
FIG. 18 is a diagram illustrating a fifth comparative example.
Figure 19:
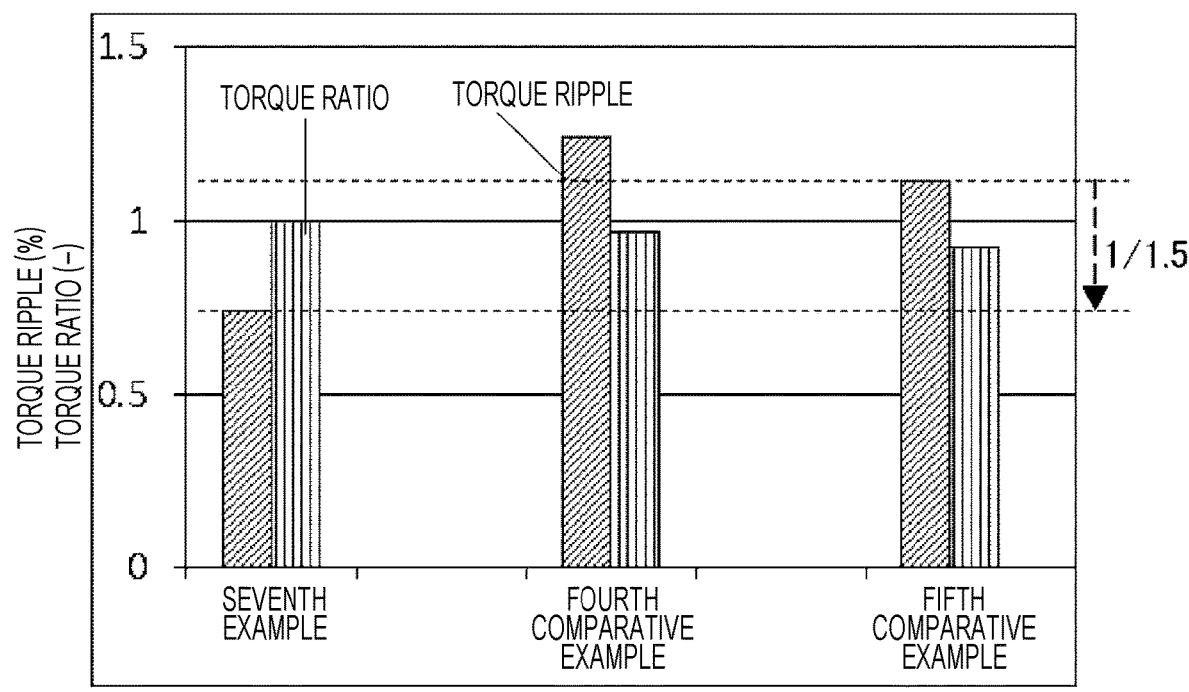
FIG. 19 is a diagram for describing a difference in torque ripple between a seventh example according to the invention and the fourth and fifth comparative examples.

FIG. 19 is a diagram for describing a difference in torque ripple between the seventh example according to the invention and the fourth and fifth comparative examples. FIG. 19 illustrates the torque ripple of the fourth and fifth comparative examples (the IPM rotary electric machines having a magnetic pole shape as illustrated in FIGS. 17 and 18 respectively) and the seventh example of the invention, and also illustrates the torque ratio of the fourth and fifth comparative examples when the torque of the seventh example is set to 1. The fourth comparative example illustrated in FIG. 17 has a VIPM structure in which both ends of the magnetic pole are formed integrally with protrusions and formed obliquely. The fifth comparative example illustrated in FIG. 18 has a VIPM structure in which both ends of the magnetic pole are integrated with protrusions and is formed in a semi-cylindrical shape. Further, the seventh example corresponds to the permanent magnet rotary electric machine 1 of the seventh embodiment having the magnetic pole structure illustrated in FIG. 16. In addition, the torque ripple in each example illustrated in FIG. 19 is calculated in the same manner as in FIG. 6, with the air gap length set to 0.5 mm.

As illustrated in FIG. 19, the torque ripple of the seventh example is 0.74%, the torque ripple of the fourth comparative example is 1.24%, and the torque ripple of the fifth comparative example is 1.12%. In other words, the torque ripple of the seventh example is about 1/1.5 times that of the fourth and fifth comparative examples. Therefore, it can be seen that the torque ripple in the seventh example is sufficiently small, and the object of the invention of reducing the torque ripple can be achieved. On the other hand, in the fourth and fifth comparative examples, the reduction of the torque ripple is somewhat insufficient, and it can be seen that it is difficult to achieve the object of the invention.

In addition, as illustrated in FIG. 19, the torque ratio based on the seventh example is 0.97 in the fourth comparative example and 0.85 in the fifth comparative example. With this configuration, it can be seen that, in comparison with the fourth and fifth comparative examples, a permanent magnet rotary electric machine having a small size and a large torque output can be realized in the seventh example.

As described above, in the rotor core 200 of this embodiment, the magnetic pole 220 includes the protrusion 222 (the first protrusion 222a and the second protrusion 222b) and the side surface portion 241 which are not provided in the fourth and fifth comparative examples. With this configuration, it can be seen that this configuration can reduce the torque ripple.

Figure 20:
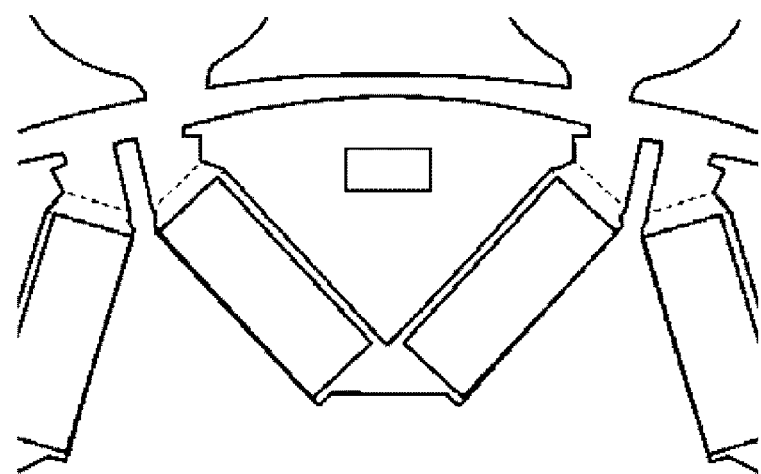
FIG. 20 is a diagram illustrating a sixth comparative example.
Figure 21:
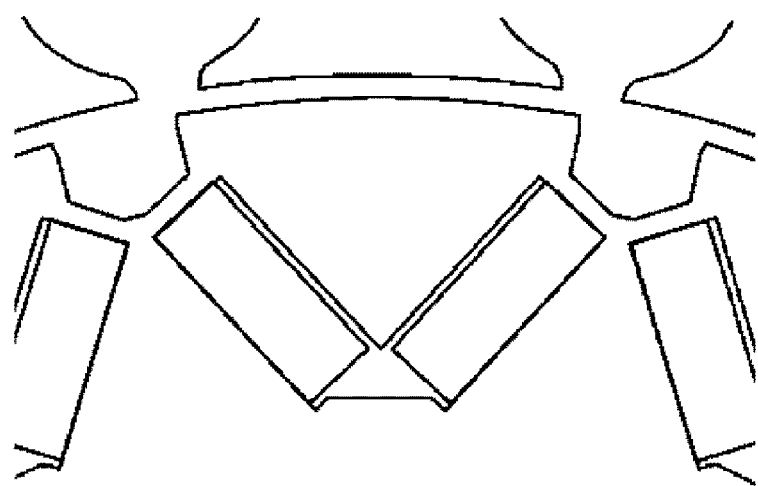
FIG. 21 is a diagram illustrating a seventh comparative example.
Figure 22:
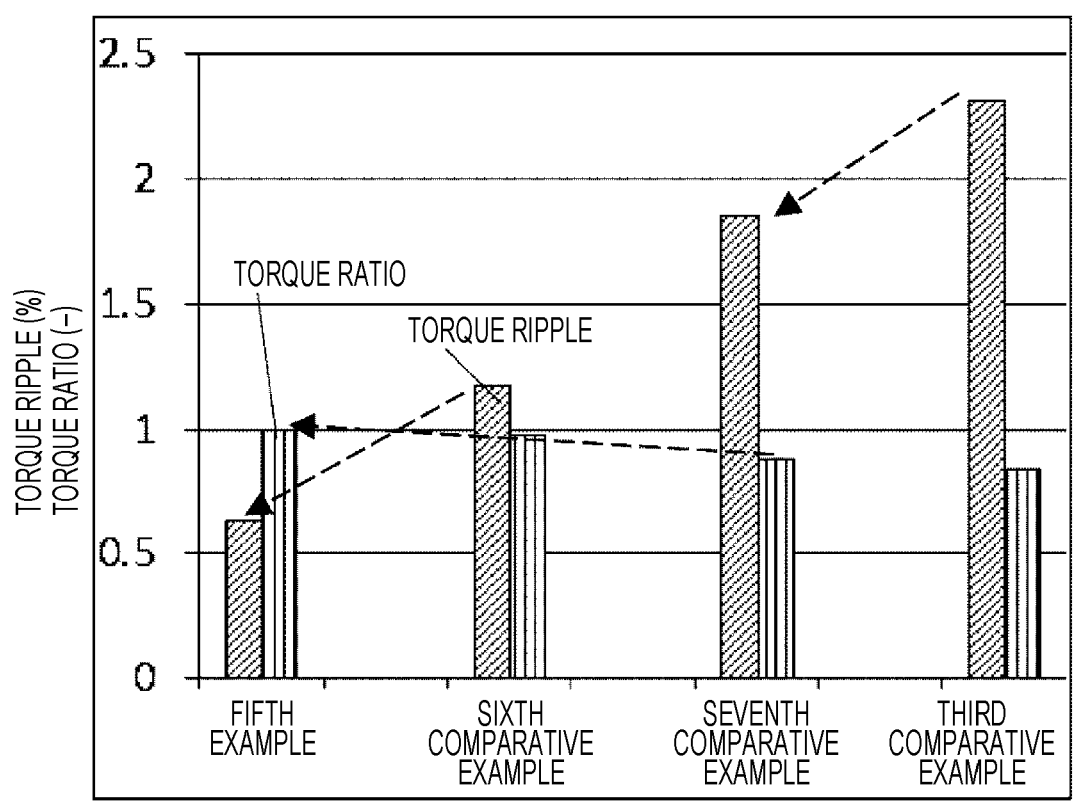
FIG. 22 is a diagram for describing a difference in torque ripple between the fifth example according to the invention and the third, sixth, and seventh comparative examples.

FIG. 22 is a diagram for describing a difference in torque ripple between the fifth example according to the invention and the third, sixth, and seventh comparative examples. FIG. 22 illustrates the torque ripple of the sixth and seventh comparative examples (the IPM rotary electric machines having a magnetic pole shape as illustrated in FIGS. 20 and 21 respectively) and the third comparative example illustrated in FIG. 14 described above, and the fifth example described in the fifth embodiment, and also illustrates the torque ratio of the third, sixth, and seventh comparative examples when the torque of the sixth example is set to 1. The sixth comparative example illustrated in FIG. 20 has a VIPM structure in which the bottom of the space between the magnetic poles protrudes in the q-axis direction. The seventh comparative example illustrated in FIG. 21 has a VIPM structure in which the ends of the magnetic poles are formed in a slightly oblique semi-cylindrical shape. Further, the torque ripple in each example illustrated in FIG. 22 is calculated by the same method as in FIG. 6, with the air gap length set to 0.5 mm.

As illustrated in FIG. 22, the torque ripple of the fifth example is sufficiently small at 0.63%, and it can be seen that the object of the invention of reducing the torque ripple can be achieved. On the other hand, the torque ripple of the sixth comparative example is 1.18%, the torque ripple of the seventh comparative example is 1.86%, and the torque ripple of the third comparative example is 2.32%. In other words, the reduction of the torque ripple is somewhat insufficient in the sixth comparative example, the torque ripple is large in the seventh and third comparative examples, and it can be seen that both are difficult to achieve the object of the invention.

As described above, in the rotor core 200 of the invention, the q-axis outer peripheral portion 244 is arranged on the inner peripheral side in the radial direction from the side surface portion 241, and the magnetic pole 220 includes the protrusion 222 (the first protrusion 222a and the second protrusion 222b) and the side surface portion 241, so that it can be seen that the torque ripple is greatly reduced.

In addition, as illustrated in FIG. 22, the torque ratio based on the fifth example is 0.98 in the sixth comparative example. In other words, the torque output of the sixth comparative example is smaller than that of the fifth example. In addition, the torque ratio is 0.88 in the seventh comparative example where the bridges are fully connected, and 0.85 in the third comparative example. With this configuration, it can be seen that, in comparison with the third and seventh comparative examples, a permanent magnet rotary electric machine having a small size and a large torque output can be realized in the fifth example.

Eighth Embodiment

Figure 23:
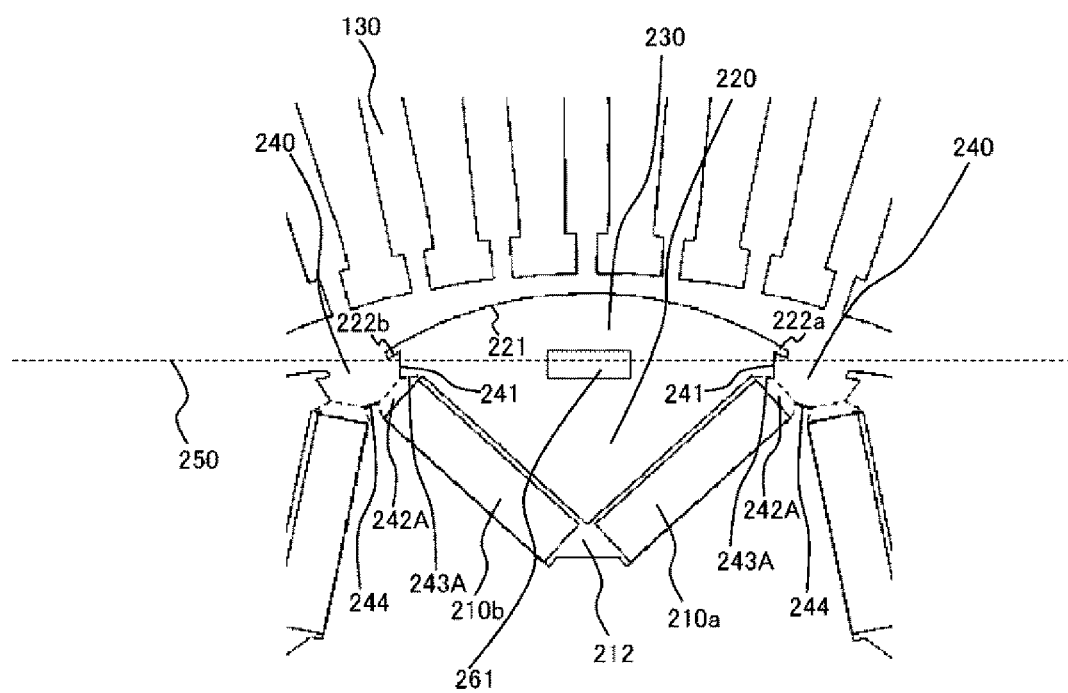
FIG. 23 is an enlarged view of the vicinity of a magnetic pole of a cross section of a rotor according to an eighth embodiment of the invention.

Next, the permanent magnet rotary electric machine 1 according to an eighth embodiment of the invention will be described with reference to FIG. 23. FIG. 23 is an enlarged view of the vicinity of the magnetic pole of the cross section of the rotor 20 according to the eighth embodiment, and corresponds to FIG. 7A described in the third embodiment.

The permanent magnet rotary electric machine 1 according to this embodiment is a rotary electric machine having 10 poles and 60 slots distributed winding, similarly to the third embodiment. In addition, the rotor core 200 of this embodiment is configured by laminating a plurality of first plates and a plurality of second plates similarly to the fifth embodiment. In other words, as illustrated in FIG. 23, the first plate having the bridge 242 and the second plate not having the bridge 242 are each formed by laminating in plural each, so that the bridge 242 is partially connected to form a three-dimensional structure with a thickness in the axial direction. Further, in FIG. 23, the projection of the partially connected bridge 242 in the axial direction is illustrated by the partially connected bridge 242A indicated by a broken line. The magnetic pole 220 is connected to the partially connected bridge 242A at a partially connecting portion 243A.

In addition, in the permanent magnet rotary electric machine 1 of this embodiment, the magnetic pole 220 has the same structure as in the second and third embodiments, as illustrated in FIG. 23. In other words, the magnetic pole 220 includes the first protrusion 222a and the second protrusion 222b, and the surface between the end of the first protrusion 222a (the second protrusion 222b) and the side surface portion 241 is located on the outer diameter side from the first line segment 250. With this configuration, the first protrusion 222a and the second protrusion 222b are formed such that spaces are provided between the first line segment 250 and the first protrusion 222a and the second protrusion 222b, respectively.

In the configuration of this embodiment, similarly to the fifth embodiment, the bridge 242 is configured by the partially connected bridge 242A, so that magnetic flux leakage in this portion is reduced. Therefore, when obtaining the same torque as in the third embodiment with the same thickness, the width of the polar surface of the permanent magnet 210 can be reduced, so that the magnet amount can be further reduced. Further, in this embodiment, it is preferable to provide the cover 265 described with reference to FIGS. 8E and 8F to prevent the permanent magnets 210 from scattering, similarly to the fifth embodiment.

As a result of calculation of the characteristics of the permanent magnet rotary electric machine 1 of this embodiment by magnetic field analysis, the torque ripple has been 1.0%. With this configuration, even in a rotary electric machine with 10 poles and 60 slots distributed winding, it can be seen that the characteristic of small torque ripple can be obtained. In addition, the cogging torque can be sufficiently reduced to 0.4 mN·m. Therefore, it has been confirmed that the invention is also effective in a combination of pole slots other than the 14-pole 18-slot concentrated winding and the winding method. Further, the above torque ripple and cogging torque are calculated by the same method as in FIG. 6, with the air gap length set to 0.7 mm.

Ninth Embodiment

Figure 24:
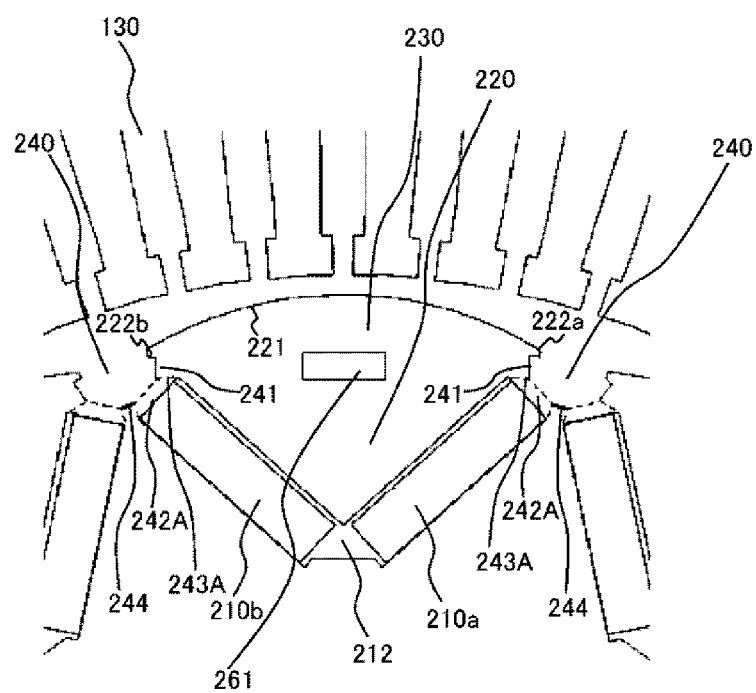
FIG. 24 is an enlarged view of the vicinity of a magnetic pole of a cross section of a rotor according to a ninth embodiment of the invention.

Next, the permanent magnet rotary electric machine 1 according to a ninth embodiment of the invention will be described with reference to FIG. 24. FIG. 24 is an enlarged view of the vicinity of the magnetic pole of the cross section of the rotor 20 according to the ninth embodiment, and corresponds to FIG. 7B described in the fourth embodiment.

The permanent magnet rotary electric machine 1 according to this embodiment is a rotary electric machine having 10 poles and 60 slots distributed winding, similarly to the fourth embodiment. In addition, the rotor core 200 of this embodiment is configured by laminating a plurality of first plates and a plurality of second plates similarly to the fifth embodiment. In other words, as illustrated in FIG. 24, the first plate having the bridge 242 and the second plate not having the bridge 242 are each formed by laminating in plural each, so that the bridge 242 is partially connected to form a three-dimensional structure with a thickness in the axial direction. Further, in FIG. 24, the projection of the partially connected bridge 242 in the axial direction is illustrated by the partially connected bridge 242A indicated by a broken line. The magnetic pole 220 is connected to the partially connected bridge 242A at a partially connecting portion 243A.

In addition, in the permanent magnet rotary electric machine 1 of this embodiment, the magnetic pole 220 has the same structure as in the fourth embodiment, as illustrated in FIG. 24. In other words, the magnetic pole 220 includes the first protrusion 222a and the second protrusion 222b having the same shape as that illustrated in FIG. 3 in the first embodiment.

In the configuration of this embodiment, similarly to the fifth embodiment, the bridge 242 is configured by the partially connected bridge 242A, so that magnetic flux leakage in this portion is reduced. Therefore, when obtaining the same torque as in the fourth embodiment with the same thickness, the width of the polar surface of the permanent magnet 210 can be reduced, so that the magnet amount can be further reduced. Further, in this embodiment, it is preferable to provide the cover 265 described with reference to FIGS. 8E and 8F to prevent the permanent magnets 210 from scattering, similarly to the fifth embodiment.

As a result of calculation of the characteristics of the permanent magnet rotary electric machine 1 of this embodiment by magnetic field analysis, the torque ripple has been 1.0%. With this configuration, it can be seen that even in the rotary electric machine having 10 poles and 60 slots distributed winding, the characteristic that the torque ripple is small can be obtained. In addition, the cogging torque can be sufficiently reduced to 0.1 mN·m. Therefore, it has been confirmed that the invention is also effective in a combination of pole slots other than the 14-pole 18-slot concentrated winding and the winding method. Further, the above torque ripple and cogging torque are calculated by the same method as in FIG. 6, with the air gap length set to 0.7 mm.

Tenth Embodiment

Figure 25A:
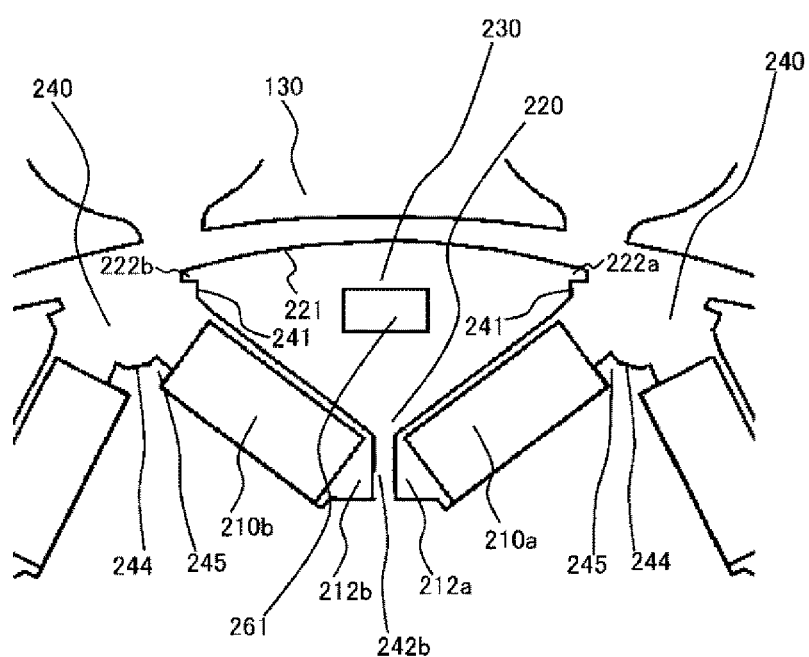
FIG. 25A is an enlarged view of the vicinity of a magnetic pole of the first plate in a rotor according to a tenth embodiment of the invention.
Figure 25B:
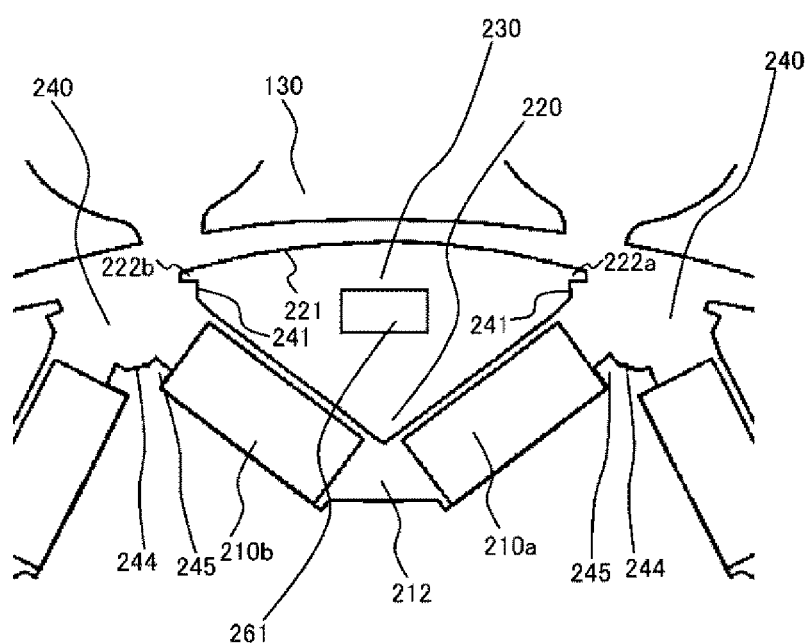
FIG. 25B is an enlarged view of the vicinity of a magnetic pole of a second plate in the rotor according to the tenth embodiment of the invention.

Next, the permanent magnet rotary electric machine 1 according to a tenth embodiment of the invention will be described using FIGS. 25A and 25B. In the rotor core 200 in the permanent magnet rotary electric machine 1 of this embodiment, the first plate and the second plate laminated in the axial direction have different shapes from that described in the fifth embodiment as illustrated in FIGS. 25A and 25B. Specifically, as illustrated in FIG. 25A, the first plate of this embodiment does not have the bridge 242, and instead includes a magnet fastening portion 245 which holds the permanent magnet 210 in the storage space 212. The magnetic pole 220 is configured such that the central portion thereof is connected to the rotor core 200 via a bridge 242b. In addition, as illustrated in FIG. 25B, the second plate of this embodiment is formed with the same magnet fastening portions 245 as those of the first plate. The first plate and the second plate are fastened to each other in the axial direction by the axial fastening portion 261.

In this embodiment, the central portion of the magnetic pole 220 is connected to the rotor core 200 via the bridge 242b. Therefore, as compared with the fifth embodiment in which both end portions of the magnetic pole 220 are connected to the rotor core 200 via the bridge 242, the magnetic pole 220 is stronger against radial direction pulling, but weaker against circumferential direction displacement. In this embodiment, the width and the number of the bridges 242b are determined in consideration of this point. Further, in comparison with the fifth embodiment, in this embodiment, the storage space 212 is divided into two by the central bridge 242b, and the first permanent magnet 210a and the second permanent magnet 210b are arranged to be interposed between the bridge 242b and the magnet fastening portions 245. Therefore, the width of these magnets tends to be slightly smaller.

In addition, in this embodiment, since there is no partially connected bridge 242A, an opening continuous in the axial direction is formed between the first space 240 and the storage space 212 unlike the opening 264 of FIG. 9 described in the fifth embodiment. Therefore, in this embodiment, it is preferable to provide the cover 265 described with reference to FIGS. 8E and 8F to cover the opening so as to prevent the permanent magnets 210 from scattering, similarly to the fifth embodiment.

As described above, the configuration of the rotor core 200 according to each embodiment of the invention is excellent in any of the torque ripple, the cogging torque, and the torque ratio as compared with the conventional configuration, and is effective. In other words, the structure of the permanent magnet rotary electric machine 1 described in each embodiment is a structure effective for reducing torque ripple.

Further, even in the third to tenth embodiments, similarly to the first and second embodiments, with the use of the permanent magnet rotary electric machine 1 of each embodiment for the EPS device, it is possible to suppress vibration and noise propagating in the vehicle interior. In addition, vibration and noise can be suppressed by applying the invention to other electric auxiliary equipment for automobiles, for example, an electric auxiliary equipment for automobile which performs electric braking. Furthermore, the application of the permanent magnet rotary electric machine 1 of each embodiment is not limited to the field of automobiles, but can be applied to all industrial permanent magnet rotary electric machines for which low vibration is preferable.

According to the embodiments of the invention described above, the following operational advantages are achieved.

(1) The rotor core 200 is configured by a plurality of laminated plates and forms the storage space 212 for the permanent magnet 210. At least two of the plurality of laminated plates in the rotor core 200 include a magnetic pole 220 having the base 230 formed on the outer peripheral side of the storage space 212, and a bridge 242 or 242b connected to the magnetic pole 220. A plurality of magnetic poles 220 are provided in the circumferential direction, and the first space 240 is formed between the bases 230 of a pair of magnetic poles 220 adjacent in the circumferential direction. The q-axis outer peripheral portion 244, which is located between the pair of circumferentially adjacent magnetic poles 220 and is in contact with the first space 240, is provided on the inner peripheral side of the base 230. The base 230 includes the side surface portion 241 which is in contact with the first space 240, and the protrusion 222 which is provided on the outer peripheral side of the side surface portion 241 and protrudes in the circumferential direction with respect to the side surface portion 241. The bridges 242 and 242b are arranged on the inner peripheral side of the side surface portion 241. With this configuration, the torque ripple can be sufficiently reduced.

(2) In the fifth to tenth embodiments, the plurality of laminated plates include the first plate having the magnetic pole 220 and the bridge 242 or 242b, and the second plate which includes the magnetic pole 220 and do not include the bridges 242 and 242b. The magnetic pole 220 of the first plate and the magnetic pole 220 of the second plate are fastened to each other in the axial direction. With this configuration, the width of the polar surface of the permanent magnet 210 can be reduced, and the amount of magnets can be reduced.

(3) In the fifth to ninth embodiments, the bridge 242 of the first plate is provided between the storage space 212 and the first space 240 by connecting the magnetic pole 220 and the q-axis outer peripheral portion 244. In addition, an opening penetrating between the storage space 212 and the first space 240 is formed between the magnetic pole 220 of the second plate and the q-axis outer peripheral portion 244. With this configuration, it is possible to reduce the amount of magnets while securely holding the permanent magnet 210 in the storage space 212.

(4) In the tenth embodiment, the bridge 242b of the first plate divides the storage space 212 and is connected to the magnetic pole 220. In addition, an opening penetrating between the storage space 212 and the first space 240 is formed between the magnetic poles 220 of the first and second plates and the q-axis outer peripheral portion 244. With this configuration, an opening which is continuous in the axial direction is formed, and the amount of magnets can be further reduced.

(5) In the fifth embodiment, the plurality of laminated plates are laminated in the axial direction, and the lamination ratio of the first plate in the plurality of laminates is higher at both ends than at the center in the axial direction. With this configuration, the rigidity of the rotor core 200 at the end in the axial direction is increased while reducing the leakage of the magnetic flux passing through the bridge 242 and increasing the torque, so that the strength of the integrated rotor core 200 can be ensured.

(6) The rotor 20 includes the rotor core 200 according to any of the first to tenth embodiments, the shaft 300 fixed to the rotor core 200, and a permanent magnet 210 disposed in the storage space 212. In addition, the permanent magnet rotary electric machine 1 includes the rotor 20, and the stator 10 having the plurality of windings 140 and arranged to face the rotor 20 via a predetermined air gap 30. With this configuration, it is possible to realize a rotary electric machine with sufficiently reduced torque ripple and a rotor used in the rotary electric machine.

(7) Further, the rotor 20 includes the rotor core 200 according to any of the fifth to tenth embodiments, the shaft 300 fixed to the rotor core 200, a permanent magnet 210 disposed in the storage space 212, and the cover 265 which covers the above-described opening. With this configuration, it is possible to prevent the permanent magnets 210 from scattering while reducing the amount of magnets.

(8) The permanent magnet rotary electric machine 1 may be, for example, a motor for electric power steering of an automobile. In addition, in the 10-pole 60-slot distributed winding as described in the third, fourth, eighth, and ninth embodiments, or the 14-pole, 18-slot concentrated winding as described in the first, second, fifth to seventh, and tenth embodiments may be applied. Therefore, the invention is applicable to various types of rotary electric machines.

(9) An automotive auxiliary electrical system for an automobile which performs the electric power steering or the electric brake using the permanent magnet rotary electric machine 1 as described above may be provided. In this way, it is possible to realize an automotive auxiliary electrical system in which vibration and noise are suppressed.

The above-described embodiments and various modifications are described as merely exemplary. The invention is not limited to the contents as long as the features of the invention are not damaged. In addition, various embodiments and modifications have been described, but the invention is not limited to these contents. Other aspects which are conceivable within a scope of technical ideas of the invention may be made within the scope of the invention.

REFERENCE SIGNS LIST 1 permanent magnet rotary electric machine
10 stator 20 rotor
30 air gap
100 stator core
110 core back
130 teeth
140 winding
200 rotor core
210 permanent magnet
210a first permanent magnet
210b second permanent magnet
212 storage space
220 magnetic pole
221 magnetic pole arc
222 protrusion
222a first protrusion
222b second protrusion
230 base
240 first space
241 side surface portion
242, 242b bridge
243 connecting portion
244 core outermost peripheral portion in q-axis direction
245 magnet fastening portion
250 first line segment
251 space facing first line segment
261 axial fastening portion
262 first plate
263 second plate
264 opening
265 cover
300 shaft

The invention claimed is:

1. A rotor core configured by a plurality of laminated plates and forming a storage space for a magnet, wherein
at least two of the plurality of laminated plates include a magnetic pole which has a base formed on an outer peripheral side of the storage space, and a bridge which is connected to the magnetic pole,
a plurality of the magnetic poles are provided in a circumferential direction,
a first space is formed between the bases of a pair of the magnetic poles adjacent in the circumferential direction,
a q-axis outer peripheral portion which is located in the middle of a pair of the magnetic poles adjacent to each other in the circumferential direction and is in contact with the first space is provided on an inner peripheral side from the base,
the base includes a side surface portion in contact with the first space, and a protrusion which is provided on an outer peripheral side from the side surface portion and protrudes in the circumferential direction with respect to the side surface portion, and
the bridge is disposed on an inner peripheral side from the side surface portion, wherein
the plurality of laminated plates include a first plate having the magnetic pole and the bridge, and a second plate having the magnetic pole and not having the bridge, and
the magnetic pole of the first plate and the magnetic pole of the second plate are fastened to each other in an axial direction.

2. The rotor core according to claim 1, wherein
the bridge of the first plate is provided between the storage space and the first space by connecting the magnetic pole and the q-axis outer peripheral portion, and
an opening penetrating between the storage space and the first space is formed between the magnetic pole of the second plate and the q-axis outer peripheral portion.

3. A rotor, comprising:
the rotor core according to claim 2;
a rotation shaft which is fixed to the rotor core;
a permanent magnet which is disposed in the storage space; and
a cover which covers the opening.

4. The rotor core according to claim 1, wherein
the bridge of the first plate is connected to the magnetic pole by dividing the storage space, and
an opening penetrating between the storage space and the first space is formed between the magnetic poles of the first and second plates and the q-axis outer peripheral portion.

5. The rotor core according to claim 1, wherein
the plurality of laminates are laminated in the axial direction, and
a lamination ratio of the first plate in the plurality of laminated plates is higher at both ends than at the center in the axial direction.

6. A rotor, comprising:
the rotor core according to claim 1;
a rotation shaft which is fixed to the rotor core; and
a permanent magnet disposed in the storage space.

7. A rotary electric machine, comprising:
the rotor according to claim 6; and
a stator which includes a plurality of windings and arranged to face the rotor via a predetermined air gap.

8. The rotary electric machine according to claim 7, wherein the rotary electric machine is a motor for electric power steering of an automobile.

9. The rotary electric machine according to claim 7, wherein the rotary electric machine has a configuration of 10 poles 60 slots distributed winding or 14 poles 18 slots concentrated winding.

10. An automotive auxiliary electrical system, comprising the rotary electric machine according to claim 7, wherein the rotary electric machine is used to perform electric power steering or electric braking.

* * * * *